US012804709B2

(12) United States Patent
Wu

(10) Patent No.: US 12,804,709 B2
(45) Date of Patent: Nov. 17, 2026

(54) CHANNEL ACCESS METHOD AND DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 261 days.

(21) Appl. No.: 18/348,475

(22) Filed: Jul. 7, 2023

(65) Prior Publication Data

US 2023/0354415 A1 Nov. 2, 2023

Related U.S. Application Data

(63) Continuation of application No. PCT/CN2021/070970, filed on Jan. 8, 2021.

(51) Int. Cl.
*H04W 74/08* (2024.01)

(52) U.S. Cl.
CPC .................................... *H04W 74/08* (2013.01)

(58) Field of Classification Search
None
See application file for complete search history.

(56) References Cited

U.S. PATENT DOCUMENTS

2018/0213560 A1* 7/2018 Naghshvar ........ H04W 74/0808
2019/0132882 A1* 5/2019 Li ......................... H04W 72/23
2020/0008238 A1* 1/2020 Huang .............. H04W 74/0808
2020/0344802 A1* 10/2020 Tang ...................... H04L 5/0048
2021/0360421 A1* 11/2021 Wang .................. H04W 74/006
2022/0124796 A1* 4/2022 Salem ................... H04L 5/0051
(Continued)

FOREIGN PATENT DOCUMENTS

CN 108574953 A 9/2018
CN 110169188 A 8/2019
(Continued)

OTHER PUBLICATIONS

International Search Report and Written Opinion dated Sep. 29, 2021 in International Application No. PCT/CN2021/070970. English translation attached.
(Continued)

*Primary Examiner* — Benjamin Lamont
(74) *Attorney, Agent, or Firm* — Sheppard, Mullin, Richter & Hampton LLP

(57) ABSTRACT

The present disclosure provides a channel access method and device. The channel access method includes: determining, by a first device, to transmit a first physical channel or physical signal on a first carrier, the first physical channel or physical signal corresponding to a first channel access mode, and the first carrier being on an unlicensed spectrum within a first frequency range; performing, by the first device, channel access on the first carrier based on the first channel access mode; and transmitting the first physical channel or physical signal via the first carrier after the channel access succeeds. A channel access procedure corresponding to the first channel access mode is: a channel access procedure with channel sensing for a fixed sensing slot length; or a channel access procedure without channel sensing.

14 Claims, 5 Drawing Sheets

(56) References Cited

U.S. PATENT DOCUMENTS

| | | | | |
|---|---|---|---|---|
| 2022/0183053 | A1* | 6/2022 | Li | H04W 74/006 |
| 2022/0272548 | A1* | 8/2022 | Yerramalli | H04W 72/541 |
| 2022/0312482 | A1* | 9/2022 | Niu | H04W 74/0816 |
| 2023/0319874 | A1* | 10/2023 | Myung | H04W 72/0457<br>370/329 |
| 2023/0336279 | A1* | 10/2023 | Park | H04W 72/23 |

FOREIGN PATENT DOCUMENTS

| | | | | |
|---|---|---|---|---|
| CN | 111756488 | A | 10/2020 | |
| CN | 111757542 | A | 10/2020 | |
| WO | WO-2019136720 | A1 * | 7/2019 | H04L 5/0048 |
| WO | 2020159726 | A1 | 8/2020 | |
| WO | 2020223372 | A1 | 11/2020 | |

OTHER PUBLICATIONS

Intel Corporation, "Presentation of Report to TSG:TR 38.808 v100: Study on supporting NR from 52.6 GHz to 71 GHz" 3GPP TSG-RAN Meeting #90-e Tdoc RP-202254, Nov. 29, 2020,Section 5.2.2.

Extended European Search Report dated Jan. 3, 2024 received in European Patent Application No. EP21916852.3.

Sandra Lagen et al:"New Radio Beam-based Access to Unlicensed Spectrum: Design Challenges and Solutions", arxiv.org, Cornell University Library, 201 Olin Library Cornell University Ithaca, NY 14853, Sep. 27, 2018 (Sep. 27, 2018), XP081502495.

* cited by examiner

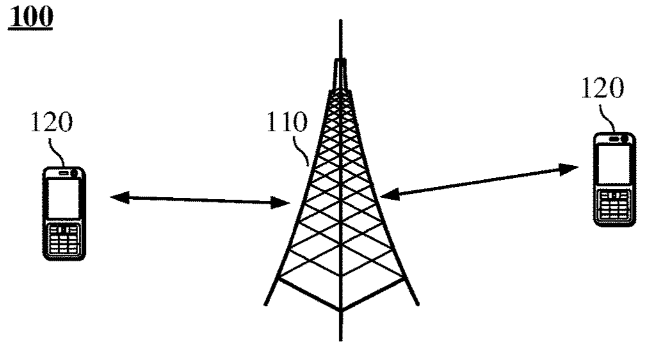

FIG. 1

200

Determining, by a terminal device, a first channel access mode corresponding to a first physical channel or physical signal, the first physical channel or physical signal comprising an uplink physical channel or physical signal on a first carrier, and/or the first physical channel or physical signal including a sidelink physical channel or physical signal on the first carrier, and the first carrier being on an unlicensed spectrum within a first frequency range, wherein the first channel access mode includes one of: a channel access without channel sensing, a channel access of a first type, a channel access of a second type, a receiver-assisted channel access corresponding to the first type, a receiver-assisted channel access corresponding to the second type, or a receiver-assisted channel access without channel sensing

S210

FIG. 2

CHANNEL ACCESS METHOD AND DEVICE

CROSS-REFERENCE TO RELATED APPLICATION

This application is a continuation of International Application No. PCT/CN2021/070970 filed on Jan. 8, 2021, the entire disclosures of which are incorporated herein by reference.

TECHNICAL FIELD

The embodiments of the present disclosure relate to communication technology, and more particularly, to a channel access method, and a channel access device.

BACKGROUND

With the evolution of New Radio (NR) system, the system can support higher frequency ranges, such as Frequency Range X (FRX) band. The FRX band has a range of 52.6 GHz-71 GHz. The Listen Before Talk (LBT) mode on the unlicensed spectrum in the FRX band is different from the LBT mode on the unlicensed spectrum in the FR1 band. On the FRX band, several modes such as omnidirectional LBT, directional LBT, receiver-assisted LBT, and no LBT may also be introduced. When a communication device (such as a terminal device or a network device) performs channel access on the unlicensed spectrum in the FRX band, how to determine the corresponding channel access mode is an urgent problem to be solved.

SUMMARY

The present disclosure provides a channel access method, and a channel access device.

In a first aspect, a channel access method is provided. The method includes: determining, by a first device, to transmit a first physical channel or physical signal on a first carrier, the first physical channel or physical signal corresponding to a first channel access mode, and the first carrier being on an unlicensed spectrum within a first frequency range; performing, by the first device, channel access on the first carrier based on the first channel access mode; and transmitting the first physical channel or physical signal via the first carrier after channel access succeeds. A channel access procedure corresponding to the first channel access mode is: a channel access procedure with channel sensing for a fixed sensing slot length; or a channel access procedure without channel sensing.

In a second aspect, a channel access device is provided. The channel access device includes a processor and a memory. The memory has a computer program stored thereon, and the processor is configured to invoke and execute the computer program stored in the memory to perform the method according to the above first aspect or any implementation thereof.

BRIEF DESCRIPTION OF DRAWINGS

FIG. 1 is a schematic diagram showing a communication system architecture where an embodiment of the present disclosure is applicable.

FIG. 2 is a schematic flow chart illustrating a channel access method according to an embodiment of the present disclosure.

DESCRIPTION OF EMBODIMENTS

Figure 3:
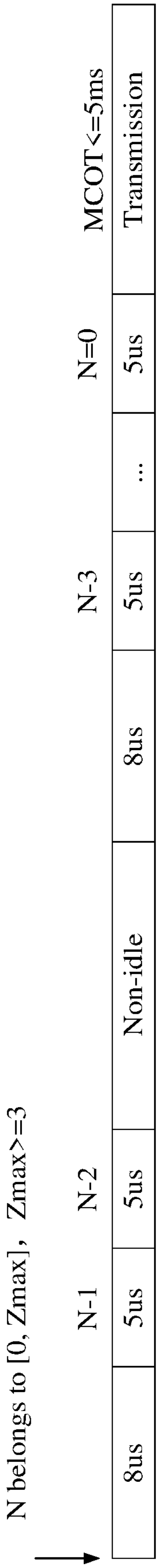
FIG. 3 is a schematic diagram showing a channel access procedure of a first type according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure can be applied to a Carrier Aggregation (CA) scenario, a Dual Connectivity (DC) scenario, a Standalone (SA) network deployment scenario, and the like.

Optionally, the communication system of an embodiment of the present disclosure can be applied to unlicensed spectrum or shared spectrum. Alternatively, the communication system of an embodiment of the present disclosure can be applied to licensed spectrum or non-shared spectrum.

The embodiments of the present disclosure are described in conjunction with a network device and a terminal device. The terminal device can refer to a User Equipment (UE), an access terminal, a user unit, a user station, a mobile station, a remote station, a remote terminal, a mobile device, a user terminal, a terminal, a wireless communication device, a user agent, or a user device.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device can be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device can also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices can include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device can be a device communicating with mobile devices. The network device can be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device can have mobile characteristics, e.g., the network device can be a mobile device. Optionally, the network device can be a satellite or a balloon station. For example, the satellite can be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device can also be a base station provided in a location such as land or water.

In the embodiment of the present disclosure, the network device can provide services for a cell, and the terminal device can communicate with the network device over transmission resources, e.g., frequency domain resources or frequency spectral resources, used in the cell. The cell can be a cell corresponding to the network device (e.g., base station). The cell can belong to a macro base station or a base station corresponding to a small cell. The small cell here can include a metro cell, a micro cell, a pico cell, a femto cell, or the like. These small cells have characteristics such as small coverage and low transmission power, and are suitable for providing high-rate data transmission services.

Exemplarily, FIG. 1 is a schematic diagram showing an architecture of a communication system 100 where an embodiment of the present disclosure is applicable. A shown in FIG. 1, the communication system 100 can include a network device 110 which can be a device communicating with a terminal device 120 (or referred to as communication terminal or terminal). The network device 110 can provide communication coverage for a particular geographic area, and can communicate with terminal devices located within the coverage.

FIG. 1 exemplarily shows one network device and two terminal devices. Optionally, the communication system 100 can include multiple network devices, and the coverage of each network device can include other numbers of terminal devices. The embodiment of the present disclosure is not limited to this.

Optionally, the wireless communication system 100 can also include other network entities such as a network controller, a Mobility Management Entity (MME). The embodiment of the present disclosure is not limited to this.

It can be appreciated that, in the embodiments of the present disclosure, a device having a communication function in a network/system can be referred to as a communication device. Taking the communication system 100 shown in FIG. 1 as an example, the communication devices can include the network device 110 and the terminal device 120 with communication functions. The network device 110 and the terminal device 120 can be the specific devices described above, and details thereof will be omitted here. The communication devices can also include other devices in the communication system 100, e.g., other network entities such as a network controller, an MME, etc., and the embodiment of the present disclosure is not limited to any of these examples.

In addition, the terms "system" and "network" can often be used interchangeably herein. The term "and/or" as used herein only represents a relationship between correlated objects, including three relationships. For example, "A and/or B" can mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure can be a direct indication, an indirect indication, or an association. For example, if A indicates B, it can mean that A directly indicates B, e.g., B can be obtained from A. Alternatively, it can mean that A indicates B indirectly, e.g., A indicates C and B can be obtained from C. Alternatively, it can mean that there is an association between A and B.

In the description of the embodiments of the present disclosure, the term "corresponding" can mean that there is a direct or indirect correspondence between the two, or can mean that there is an association between the two, or that they are in a relation of indicating and indicated, configuring or configured, or the like.

In the embodiments of the present disclosure, "predefined" can implemented as pre-stored in one or more devices (for example, including a terminal device and a network device) corresponding codes, tables or other means that can be used to indicate related information, and the present disclosure is not limited to its specific implementation. For example, "predefined" can refer to defined in protocols.

In the embodiments of the present disclosure, "protocols" can refer to standard protocols in the communication field, including e.g., the LTE protocol, the NR protocol, and related protocols applied in future communication systems. The present disclosure is not limited to any of these examples.

In order to facilitate understanding of the technical solutions of the embodiments of the present disclosure, high frequency related to the present disclosure will be described.

The research on NR system considers two frequency bands currently, Frequency Range 1 (FR1) and Frequency Range 2 (FR2). The frequency range included in FR1 and FR2 are shown in Table 1.

TABLE 1

| Definition of frequency band | Corresponding frequency range |
|---|---|
| FR1 | 410 MHz-7.125 GHz |
| FR2 | 24.25 GHz-52.6 GHz |

As NR system evolves, the technology on new frequency bands, i.e., high frequencies, are being studied. The frequency domain range included in the new frequency band is shown in Table 2, and for ease of description, is denoted as Frequency Range X (FRX) in the present disclosure. It should be understood that the name of the frequency band should not constitute any limitation. For example, FRX can be Frequency Range 3 (FR3).

TABLE 2

| Definition of frequency band | Corresponding frequency range |
|---|---|
| FRX | 52.6 GHz-71 GHz |

FRX frequency band includes licensed spectrum and unlicensed spectrum. In other words, FRX frequency band includes non-shared spectrum and shared spectrum.

The unlicensed spectrum, which is typically considered as shared spectrum, is the spectrum allocated by the country and region that can be used for radio device to communicate. That is, communication devices in different communication systems can use this spectrum as long as they meet regulatory requirements set by the country or region on the spectrum, without having to apply for exclusive spectrum authorization from the government.

In order to allow various communication systems that use the unlicensed spectrum for wireless communication to coexist friendly on this spectrum, some countries or regions have specified regulatory requirements that must be met when using the unlicensed spectrum. For example, the communication device follows the principle of "Listen Before Talk (LBT)", that is, before the communication device transmits a signal on a channel on the unlicensed spectrum, it needs to perform channel sensing first. Only when the channel sensing result shows that the channel is idle, the communication device can transmit the signal. If the channel sensing result of the communication device on the channel of the unlicensed spectrum shows that the channel is busy, the communication device cannot transmit the signal. As another example, in order to ensure fairness, in one transmission, the time length during which the communication device performs signal transmission using the channel on the unlicensed spectrum cannot exceed a predetermined time length. For another example, in order to prevent the power of the signal transmitted on the channel of the unlicensed spectrum from being so large as to affect the transmission of other important signals on the channel, the communication device needs to follow the restriction of not exceeding the maximum power spectral density when using the channel of the unlicensed spectrum for signal transmission.

For the FRX band, a larger subcarrier spacing can be considered than for the FR2, and current candidate subcarrier spacing includes at least one of: 240 kHz, 480 kHz, or 960 kHz. As an example, the Numerology corresponding to these candidate subcarrier spacings are shown in Table 3 below, and the numerology can include: Subcarrier Spacing (SCS), Symbol length, Normal Cyclic Prefix (NCP) length, and Extended Cyclic Prefix (ECP) length.

TABLE 3

| Subcarrier Spacing | Symbol length | NCP length | ECP Length | Symbol with NCP length | Slot length |
|---|---|---|---|---|---|
| 240 kHz | 4.16 μs | 0.292 μs | 1.04 μs | 4.452 μs | 62.5 μs |
| 480 kHz | 2.08 μs | 0.146 μs | 0.52 μs | 2.226 μs | 31.25 μs |
| 960 kHz | 1.04 μs | 0.073 μs | 0.26 μs | 1.113 μs | 15.625 μs |

In order to facilitate a better understanding of embodiments of the present disclosure, some basic concepts about transmission on the shared spectrum related to the present application are explained.

Maximum Channel Occupancy Time (MCOT): the maximum length of time during which a channel on a shared spectrum is allowed for signal transmission after successful channel sensing on the channel.

Channel Occupancy Time (COT): the length of time during which a channel on a shared spectrum can be used for signal transmission after successful channel sensing on the channel. It can also be considered as the length of time during which the channel on the shared spectrum can be occupied after successful channel sensing on the channel. Here, the channel can be occupied by the signal within the time length continuously or discontinuously, and the time length includes total time for signal transmission by the device initiating the channel occupancy and the device sharing the channel occupancy.

Channel Occupancy Time of network device (gNB/eNB-initiated COT): also known as COT initiated by network device, which refers to one channel occupancy time obtained by a network device after successful channel sensing on a channel on a shared spectrum. The COT initiated by the network device can not only be used by the network device for transmission, but can also be used by the terminal device for transmission under certain conditions.

Channel Occupancy Time of terminal device (UE-initiated COT): also known as COT initiated by terminal device, which refers to one channel occupancy time obtained by a terminal device after successful channel sensing on a channel on a shared spectrum. The COT initiated by the terminal device can not only be used by the terminal device for transmission, but can also be used by the network device for transmission under certain conditions.

Downlink Transmission Burst (Downlink Transmission Burst): a set of downlink transmissions performed by a network device (that is, including one or more downlink transmissions). The set of downlink transmissions is continuous transmissions (that is, there is no gap between the downlink transmissions), or there are gaps in between the downlink transmissions in the set but the gaps are smaller than or equal to 16 μs. If a gap between two downlink transmissions by the network device is greater than 16 μs, then the two downlink transmissions are considered as belonging to two downlink transmission bursts.

Uplink Transmission Burst (Uplink Transmission Burst): a set of uplink transmissions performed by a terminal device (that is, including one or more uplink transmissions). The set of uplink transmissions is continuous transmissions (that is, there is no gap between the uplink transmissions), or there are gaps in between the uplink transmissions in the set but the gaps are smaller than or equal to 16 μs. If a gap between two uplink transmissions by the terminal device is greater than 16 μs, then the two uplink transmissions are considered as belonging to two uplink transmission bursts.

Channel sensing success: also known as channel being sensed as idle. For example, the energy detection performed on a channel in a sensing time slot is lower than an energy detection threshold.

Channel sensing failure: also known as channel being sensed as busy. For example, the energy detection performed on a channel in a sensing time slot is higher than or equal to an energy detection threshold.

In order to facilitate a better understanding of the embodiments of the present disclosure, the channel access in release 16 (Rel-16) NR-U system related to the present disclosure is described.

In Rel-16 NR-U system, from the perspective of network deployment of the system, channel sensing includes two mechanisms: one is LBT for Load Based Equipment (LBE), also known as dynamic channel sensing, dynamic channel access or dynamic channel occupancy, and the other is LBT for Frame Based Equipment (FBE), also known as semi-static channel sensing, semi-static channel access or semi-static channel occupancy.

In the LBE channel access mechanism, the channel access mode includes Type 1 channel access, Type2A channel access, Type2B channel access and Type2C channel access.

In the FBE channel access mechanism, the channel access mode includes channel access with channel sensing for a sensing slot length of 9 microseconds and channel access without channel sensing.

When the terminal device is dynamically scheduled for uplink transmission, the network device can carry the channel access indication information in the scheduling information such as Downlink Control Information DCI, and the terminal device can determine the channel access mode corresponding to the uplink transmission based on the channel access indication information transmitted by the network device. When the terminal device performs uplink transmission via preconfigured resources, the terminal device can perform channel access based on the predetermined channel access mode.

In order to facilitate a better understanding of the embodiments of the present disclosure, the channel access corresponding to the unlicensed spectrum on the FRX band related to the present disclosure is described.

On the FRX band, for countries and regions with LBT requirements, LBT mode (that is, channel access mode) can include omnidirectional LBT, directional LBT, receiver-assisted LBT and no LBT. For the channel access mode without LBT, it can also be limited by certain conditions, such as Automatic Transfer Power Control (ATPC), Dynamic Frequency Selection (DFS), long-term interference detection or other interference elimination mechanisms. In addition, it is possible to switch between the channel access with LBT and the channel access without LBT.

For countries and regions without LBT requirements, it is also necessary to consider whether to introduce certain conditions, such as whether DFS needs to be applied, whether ATPC needs to be applied, whether long-term interference detection needs to be applied, whether to limit a certain duty cycle, whether to limit a certain transfer power, whether to limit MCOT, and so on.

Due to the relatively high frequency band, the LBT mode on the unlicensed spectrum in the FRX band is different from the LBT mode on the unlicensed spectrum in the FR1 band. In addition, several modes such as omnidirectional LBT, directional LBT, receiver-assisted LBT, and no LBT can be introduced on the FRX band. Correspondingly, in the communication system with network deployment on the unlicensed spectrum in the FRX band, when a communication device, such as a network device and a terminal device, needs to perform channel access on the unlicensed spectrum, there is no clear scheme for how to determine the corresponding channel access mode and how to perform LBT.

Based on the above problems, the present application proposes a channel access scheme. The terminal device and/or the network device can determine the corresponding channel access mode when performing channel access on the unlicensed spectrum in the FRX band, thereby optimizing the communication performance on the FRX band.

The technical solution of the present disclosure is described in detail by specific embodiments.

FIG. 2 is a schematic flow chart illustrating a channel access method 200 according to an embodiment of the present disclosure. As shown in FIG. 2, The method 200 can include at least part of the following content.

At S210, a terminal device determines a first channel access mode corresponding to a first physical channel or physical signal. The first physical channel or physical signal includes an uplink physical channel or physical signal on a first carrier, and/or the first physical channel or physical signal includes a sidelink physical channel or physical signal on the first carrier. The first carrier is on an unlicensed spectrum within a first frequency range. The first channel access mode includes one of: a channel access without channel sensing, a channel access of a first type, a channel access of a second type, a receiver-assisted channel access corresponding to the first type, a receiver-assisted channel access corresponding to the second type, or a receiver-assisted channel access without channel sensing.

In an embodiment of the present disclosure, the terminal device determining the first channel access mode corresponding to the first physical channel or physical signal can include: the terminal device determining the first channel access mode as a channel access mode of initiating channel occupancy for the first physical channel or physical signal, or the terminal device transmitting the first physical channel or physical signal after initiating channel occupancy using the first channel access mode and succeeding in channel access.

In particular, the first physical channel or physical signal can be a first physical channel or a first physical signal. That is, S210 can be that: the terminal device can determine the first channel access mode corresponding to the first physical channel based on first information. The first physical channel includes an uplink physical channel on the first carrier and/or a sidelink physical channel on the first carrier. Alternatively, S210 can be that: the terminal device can determine the first channel access mode corresponding to the first physical signal based on the first information. The first physical signal includes an uplink physical signal on the first carrier and/or a sidelink physical signal on the first carrier.

In some embodiments, the uplink physical channel on the first carrier can include, but is not limited to, at least one of: Physical Uplink Shared Channel (PUSCH), Physical Uplink Control Channel (PUCCH), or Physical Random Access Channel (PRACH).

In some embodiments, the sidelink physical channel on the first carrier can include, but is not limited to, at least one of: Physical Sidelink Control Channel (PSCCH), Physical Sidelink Shared Channel (PSSCH), or Physical Sidelink Feedback Channel (PSFCH).

In some embodiments, the first physical channel or physical signal can include, but is not limited to, at least one of: Synchronization Signal Block (SSB) transmission burst, or Sounding Reference Signal (SRS).

In the case of sidelink transmission, SSB transmission burst can be, for example, sidelink SSB (S-SSB). Optionally, S-SSB includes a Sidelink Primary Synchronization Signal (S-PSS), a Sidelink Secondary Synchronization Signal (S-SSS), a Physical Sidelink Broadcast Channel (PSBCH), or Demodulation Reference Signal (DMRS) for PSBCH.

It should be noted that SSB can also be referred to as Synchronization Signal/Physical Broadcast Channel block (SS/PBCH block). S-SSB may also be referred to as S-SS/PSBCH block.

It should be noted that in the embodiments of the present disclosure, the "predetermined rule" can be the information agreed in protocol. That is, the terminal device can determine the first channel access mode corresponding to the first physical channel or physical signal based on the information agreed in the protocol.

In an embodiment of the present disclosure, "unlicensed spectrum" can also be referred to as "shared spectrum" or "unlicensed frequency band", and the present disclosure is not limited to any of these examples. Further, in an embodiment of the present disclosure, "channel access" can also be referred to as "LBT", and "channel access mode" can also be referred to as "LBT mode", and the present disclosure is not limited to any of these examples.

In some embodiments, the first frequency range can be the FRX band described above, and the frequency range can be: 52.6 GHz-71 GHz. Of course, the first frequency range can also be another frequency band higher than FR1 or FR2, and the embodiments of the present disclosure are not limited to any of these examples.

In some embodiments, the channel access of the first type includes at least one of: a channel access of the first type corresponding to omnidirectional channel sensing, or a channel access of the first type corresponding to directional channel sensing.

That is, the channel access of the first type can correspond to the omnidirectional LBT and/or the directional LBT, and the channel access of the second type can correspond to the omnidirectional LBT and/or the directional LBT.

In some embodiments, the channel access of the first type is a channel access mode with sensing for a plurality of random backoff sensing slots.

In some embodiments, the channel access of the first type corresponding to omnidirectional channel sensing can also be referred to as the channel access of the first type, and the present disclosure are not limited to any of these examples.

In some embodiments, the channel access of the second type includes at least one of: a channel access of the second type corresponding to omnidirectional channel sensing, or a channel access of the second type corresponding to directional channel sensing.

That is, the channel access of the second type can correspond to the omnidirectional LBT and/or the directional LBT.

In some embodiments, the channel access of the second type is a channel access mode with sensing for a fixed sensing slot length.

In some embodiments, the channel access of the second type corresponding to omnidirectional channel sensing can also be referred to as the channel access of the second type, and the present disclosure are not limited to any of these examples.

In some embodiments, for the channel access without channel sensing, as an example, if a gap between the uplink transmission burst and the downlink transmission burst does not exceed 16 microseconds, the terminal device can start to transmit the uplink transmission burst without channel sensing after the downlink transmission burst ends; as another example, if the terminal device determines that the first channel access mode corresponding to the first physical channel or the physical signal on the first carrier on the unlicensed spectrum is the channel access without channel sensing, the terminal device can directly transmit the first physical channel or physical signal without channel sensing on the first carrier.

In some embodiments, the receiver-assisted channel access includes a channel sensing mode based on a request-response procedure. For example, the receiver-assisted channel access includes a channel sensing mode based on interaction of transmission request information and transmission response information.

As an example, during the communication between the first device and the second device, the first device transmits a transmission request information to ask whether the second device is ready for data transmission before the data transmission occurs. After the second device receives the transmission request information, if the channel access procedure succeeds, the second device can transmit transmission response information to the first device to inform the first device that it is ready for data transmission. The first device can transmit data to the second device after receiving the transmission response information. Alternatively, if the second device does not receive the transmission request information, or if the second device receives the transmission request information but cannot transmit the transmission response information due to channel access failure, the second device will not transmit the transmission response information to the first device. The first device can abandon the data transmission to the second device when receiving no transmission response information from the second device.

In some embodiments, the receiver-assisted channel access corresponding to the first type includes: channel access for transmitting the transmission request information being the channel access of the first type, and/or, channel access for transmitting the transmission response information being the channel access of the first type.

In some embodiments, the receiver-assisted channel access corresponding to the second type includes: channel access for transmitting the transmission request information being the channel access of the second type, and/or, channel access for transmitting the transmission response information being the channel access of the second type.

In some embodiments, the receiver-assisted channel access without channel sensing includes: channel access for transmitting the transmission request information being the channel access without channel sensing, and/or, channel access for transmitting the transmission response information being the channel access without channel sensing.

It should be noted that omnidirectional LBT can refer to: when the communication device senses a channel on the sensing time slot, the sensed energy includes the energy in all directions. Directional LBT can refer to: when the communication device senses a channel on the sensing time slot, the sensed energy includes the energy in a certain direction or in some specific directions.

In some embodiments, the channel access of the first type is a channel access mode with sensing for a plurality of random backoff sensing slots.

As an example, as shown in FIG. 3, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);
(2) If N>0, the counter decrements by 1, that is, N=N−1;
(3) Perform sensing on the channel for a sensing time slot length of 5 μs, and if the sensing time slot result is idle, perform step (4); otherwise, perform step (5);
(4) If N=0, the channel access procedure ends; otherwise, perform step (2);
(5) Perform sensing on the channel for a sensing time slot length of 8 μs, and if the sensing time slot result is idle, perform step (3); otherwise, perform step (5).

Figure 4:
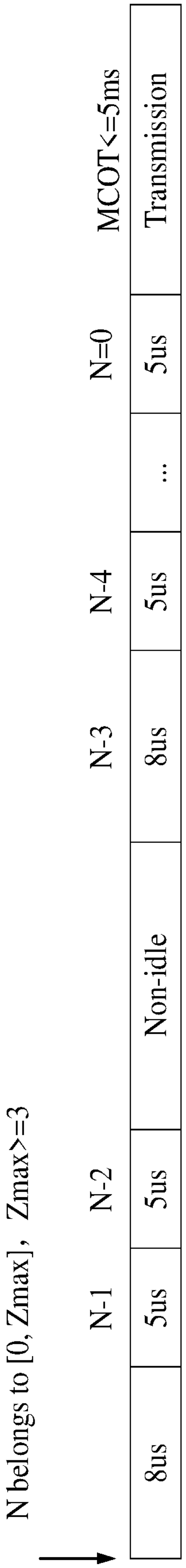
FIG. 4 is a schematic diagram showing another channel access procedure of a first type according to an embodiment of the present disclosure.

As another example, as shown in FIG. 4, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);
(2) If N>0, the counter decrements by 1, that is, N=N−1;
(3) Perform sensing on the channel for a sensing time slot length of 5 μs, and if the sensing time slot result is idle, perform step (4); otherwise, perform step (5);
(4) If N=0, the channel access procedure ends; otherwise, perform step (2);
(5) Perform sensing on the channel for a sensing time slot length of 8 μs, and if the sensing time slot result is idle, perform step (4); otherwise, perform step (5).

In some embodiments, the value of Zmax is predefined, or configured by the network device, or determined by the communication device initiating the channel access procedure of the first type.

In some embodiments, the channel access of the second type is a channel access mode with sensing for a fixed sensing slot length.

In some embodiments, the channel access of the second type includes at least one of: a channel access mode with a fixed sensing slot length of a first predetermined value; a channel access mode with a fixed sensing slot length of a second predetermined value, where the second predetermined value is greater than the first predetermined value; or a channel access mode without channel sensing.

In some embodiments, the above S210 can specifically be: determining, by the terminal device, the first channel access mode corresponding to the first physical channel or physical signal based on a predetermined rule.

In some embodiments, the first physical channel or physical signal includes the sidelink physical channel or physical signal on the first carrier, and in this case, the predetermined rule includes one of the following.

When the first physical channel or physical signal includes a PSSCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal only includes a PSFCH carrying Hybrid Automatic Repeat reQuest-ACKnowledgement (HARQ-ACK) information, the first channel access mode includes one of: the channel access without channel sensing, or the channel access of the second type.

When the first physical channel or physical signal includes a PSCCH, the first channel access mode includes at least one of: the channel access without channel sensing, the channel access of the first type, or the channel access of the second type.

When the first physical channel or physical signal includes transmission request information, the first channel access mode includes one of: the channel access without channel sensing, the channel access of the first type, or the channel access of the second type.

When the first physical channel or physical signal includes transmission response information, the first channel access mode includes one of: the channel access without channel sensing, the channel access of the first type, or the channel access of the second type.

In some embodiments, the first physical channel includes the sidelink physical channel on the first carrier, and in this case, the predetermined rule includes one of the following.

When the first physical channel includes a PSSCH, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical channel only includes a PSFCH carrying Hybrid Automatic Repeat reQuest-ACKnowledgement (HARQ-ACK) information, the first channel access mode includes one of: the channel access without channel sensing, the channel access of the second type, or the channel access of the second type corresponding to directional channel sensing.

When the first physical channel includes a PSCCH, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

When the first physical channel includes transmission request information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

When the first physical channel includes transmission response information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

In some embodiments, the first physical channel or physical signal includes the uplink physical channel or physical signal on the first carrier, and the predetermined rule includes one of the following.

When the first physical channel or physical signal includes a PUSCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes a PRACH, the first channel access mode includes one of: the channel access without channel sensing, the channel access of the second type, or the channel access of the first type.

When the first physical channel or physical signal only includes a PUCCH carrying no HARQ-ACK information, or when the first physical channel or physical signal only includes a PUSCH carrying no HARQ-ACK information and with no data, the first channel access mode includes one of: the channel access of the second type, or the channel access of the first type.

When the first physical channel or physical signal only includes a PUCCH carrying HARQ-ACK information, or when the first physical channel only includes a PUSCH carrying HARQ-ACK information and with no data, the first channel access mode includes one of: the channel access without channel sensing, or the channel access of the second type.

When the first physical channel or physical signal includes transmission request information, the first channel access mode includes one of: the channel access without channel sensing, the channel access of the second type, or the channel access of the first type.

When the first physical channel or physical signal includes transmission response information, the first channel access mode includes one of: the channel access without channel sensing, the channel access of the second type, or the channel access of the first type.

In some embodiments, the first physical channel includes the uplink physical channel on the first carrier, and the predetermined rule includes one of the following.

When the first physical channel includes a PUSCH, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical channel includes a PRACH, the first channel access mode includes one of: the channel access without channel sensing, the channel access of the second type corresponding to omnidirectional channel sensing, the channel access of the second type corresponding to directional channel sensing, the channel access of the first type corresponding to omnidirectional channel sensing, or the channel access of the first type corresponding to directional channel sensing.

When the first physical channel only includes a PUCCH carrying no HARQ-ACK information, or when the first physical channel only includes a PUSCH carrying no HARQ-ACK information and with no data, the first channel access mode includes one of: the channel access of the second type corresponding to omnidirectional channel sensing, the channel access of the second type corresponding to directional channel sensing, the channel access of the first type corresponding to omnidirectional channel sensing, or the channel access of the first type corresponding to directional channel sensing.

When the first physical channel only includes a PUCCH carrying HARQ-ACK information, or when the first physical channel only includes a PUSCH carrying HARQ-ACK information and with no data, the first channel access mode includes one of: the channel access without channel sensing, the channel access of the second type corresponding to omnidirectional channel sensing, or the channel access of the second type corresponding to directional channel sensing.

When the first physical channel includes transmission request information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

When the first physical channel includes transmission response information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

In some embodiments, the predetermined rule includes one of the following.

When the first physical channel or physical signal only includes an SRS, the first channel access mode includes one of: the channel access without channel sensing, the channel access of the second type, or the channel access of the first type.

When the first physical channel or physical signal includes an SSB transmission burst and the SSB transmission burst includes user data, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes an SSB transmission burst and the SSB transmission burst includes no user data, the first channel access mode includes one of: the channel access without channel sensing, or the channel access of the second type.

In some embodiments, the first physical signal includes the uplink physical signal on the first carrier and/or the sidelink physical signal on the first carrier, and the predetermined rule includes one of the following.

When the first physical signal only includes an SRS, the first channel access mode includes one of: the channel access without channel sensing, the channel access of the second type corresponding to omnidirectional channel sensing, the channel access of the second type corresponding to directional channel sensing, the channel access of the first type corresponding to omnidirectional channel sensing, or the channel access of the first type corresponding to directional channel sensing.

When the first physical signal includes an SSB transmission burst and the SSB transmission burst includes user data, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical signal includes an SSB transmission burst and the SSB transmission burst includes no user data, the first channel access mode includes one of: the channel access without channel sensing, the channel access of the second type corresponding to omnidirectional channel sensing, or the channel access of the second type corresponding to directional channel sensing.

In some embodiments, in a case that the first physical channel only includes PUCCH carrying HARQ-ACK information, a certain condition needs to be satisfied for the first channel access mode to be the channel access without channel sensing. Alternatively, in a case that the first physical channel only includes PUSCH that carries HARQ-ACK information and no data, a certain condition needs to be satisfied for the first channel access mode to be the channel access without channel sensing. Alternatively, in a case that the first physical channel only includes PRACH, or the first physical signal only includes SRS, a certain condition needs to be satisfied for the first channel access mode to be channel access without channel sensing. The condition can be a predefined condition.

Taking as an example the PUCCH transmission carrying HARQ-ACK information, the condition includes that: a duty cycle of the PUCCH transmission carrying HARQ-ACK information is 1/20. As another example, the condition includes that: the time domain resources occupied by the PUCCH transmissions carrying HARQ-ACK information during a period of 100 ms do not exceed 10 ms.

In some embodiments, the above S210 can specifically be: determining, by the terminal device, that the first physical channel or physical signal corresponds to the first channel access mode based on first indication information. The first indication information indicates a channel access mode.

In some embodiments, the above S210 can specifically be: determining, by the terminal device, the first channel access mode corresponding to the first physical channel or physical signal based on first indication information and a predetermined rule. The first indication information indicates a channel access mode.

Specifically, the terminal device determines the first channel access mode corresponding to the first physical channel or physical signal based on the channel access mode indicated by the first indication information, when the channel access mode corresponding to the first physical channel or physical signal indicated by the first indication information is different from the channel access mode corresponding to the first physical channel or physical signal defined by the predetermined rule.

The first indication information indicates that the first physical channel or physical signal corresponds to the first channel access mode, and the predetermined rule predefines that the first physical channel or physical signal corresponds to a second channel access mode. That is, when the channel access mode indicated by the first indication information is different from the channel access mode indicated by the predetermined rule, the channel access mode indicated by the first indication information shall prevail.

In some embodiments, the second channel access mode includes one of: the channel access without channel sensing, the channel access of the first type, the channel access of the second type, the receiver-assisted channel access corresponding to the first type, the receiver-assisted channel access corresponding to the second type, or the receiver-assisted channel access without channel sensing.

In some embodiments, the first indication information indicates a channel access mode and/or a Cyclic Prefix Extension (CPE) length that are jointly coded. That is, by means of joint coding, the first indication information can indicate some other information, such as a CPE length, while indicating the channel access mode.

In some embodiments, a type of a channel sensing beam corresponding to the channel access mode is determined based on a higher layer parameter configured by a network device, or indicated by the first indication information, or predetermined; and/or a direction of the channel sensing beam is determined based on a higher layer parameter configured by a network device, or indicated by the first indication information, or predetermined.

In some embodiments, the first indication can be at least one of Downlink Control Information (DCI), Sidelink Control Information (SCI), Radio Resource Control (RRC) or Media Access Control Element (MAC CE).

For example, the terminal device receives DCI transmitted for scheduling the first physical channel or physical signal. The DCI includes the first indication information.

As another example, the terminal device receives SCI transmitted for scheduling the first physical channel or physical signal. The SCI includes the first indication information.

In some embodiments, the type of the channel sensing beam corresponding to the channel access mode includes a type corresponding to omnidirectional channel sensing or a type corresponding to directional channel sensing.

It should be noted that the type of the channel sensing beam can be omnidirectional or directional. In the directional case, the direction of the channel sensing beam can be a specific associated beam direction or a reference signal index or Transmission Configuration Indicator (TCI) information.

In some embodiments, the first indication information includes a first higher layer parameter, and the terminal device can determine the first channel access mode based on the first higher layer parameter and the predetermined rule.

As an example, the terminal device is configured with directional channel sensing. For example, the channel sensing mode corresponding to the terminal device is configured by the network device via the first higher layer parameter as directional channel sensing. Then the terminal device determines the first channel access mode corresponding to the first physical channel or physical signal based on the predetermined rule, including at least one row as shown in Table 4 below.

TABLE 4

| First physical channel or physical signal | First channel access mode |
|---|---|
| PSSCH | Channel access of the first type corresponding to directional channel sensing |
| Only includes PSFCH carrying HARQ-ACK information | Channel access without channel sensing |
| PSCCH | Channel access of the first type corresponding to directional channel sensing |
| PUSCH | Channel access of the first type corresponding to directional channel sensing |
| PRACH | Channel access of the second type corresponding to directional channel sensing |
| PUCCH carrying no HARQ-ACK information or PUSCH carrying no HARQ-ACK information and only UCI | Channel access of the second type corresponding to directional channel sensing |
| PUCCH or PUSCH only carrying HARQ-ACK information | Channel access without channel sensing |
| Only includes SRS | Channel access without channel sensing |
| Includes sidelink SSB and includes user unicast data | Channel access of the first type corresponding to directional channel sensing |
| Includes sidelink SSB and includes no user unicast data | Channel access without channel sensing |
| Transmission request information | Channel access of the second type corresponding to directional channel sensing |
| Transmission response information | Channel access of the second type corresponding to directional channel sensing |

As another example, the terminal device is configured with omnidirectional channel sensing or the terminal device is not configured with directional channel sensing. For example, the channel sensing mode corresponding to the terminal device is configured by the network device via the first higher layer parameter as the omnidirectional channel sensing or the network device doesn't configure the first higher layer parameter corresponding to directional channel sensing. Then, the terminal device determines the first channel access mode corresponding to the first physical channel or physical signal based on the predetermined rule, including at least one row as shown in Table 5 below.

TABLE 5

| First physical channel or physical signal | First channel access mode |
|---|---|
| PSSCH | Channel access of the first type |
| Only includes PSFCH carrying HARQ-ACK information | Channel access without channel sensing |
| PSCCH | Channel access of the first type |
| PUSCH | Channel access of the first type |
| PRACH | Channel access of the second type |
| PUCCH carrying no HARQ-ACK information or PUSCH carrying no HARQ-ACK information and only carrying UCI | Channel access of the second type |
| PUCCH or PUSCH only carrying HARQ-ACK information | Channel access without channel sensing |
| Only includes SRS | Channel access without channel sensing |
| Includes sidelink SSB and includes user unicast data | Channel access of the first type |
| Includes sidelink SSB and includes no user unicast data | Channel access without channel sensing |
| Transmission request information | Channel access of the second type |
| Transmission response information | Channel access of the second type |

It should be noted that in Table 5 above, the channel access of the first type can also be referred to as the channel access of the first type corresponding to omnidirectional channel sensing, and the channel access of the second type can also be referred to as the channel access of the second type corresponding to omnidirectional channel sensing.

In some embodiments, the first frequency range can be the FR1 band described above, and has a frequency band range of: 410 MHz-7.125 GHz. For example, in a case that the first physical channel or physical signal includes the sidelink physical channel or physical signal on the first carrier, the first frequency range can also be the FR1 band described above. That is, in an embodiment of the present disclosure, the unlicensed spectrum of the FR1 band supports channel access corresponding to the sidelink physical channel or physical signal.

Thus, according to embodiments of the present disclosure, the terminal device can determine the first access mode corresponding to the first physical channel or physical signal based on the first indication information and/or the predetermined rule, and the first physical channel or physical signal includes the uplink physical channel or physical signal on the first carrier on the unlicensed spectrum included in the first frequency range, and/or, the first physical channel or physical signal includes the sidelink physical channel or physical signal on the first carrier on the unlicensed spectrum included in the first frequency range. In other words, when the terminal device performs channel access on the unlicensed spectrum in the FRX band, a corresponding channel access mode can be determined, and the terminal device can use corresponding channel access modes when transmitting different channels or signals, so as to ensure the friendly coexistence of different communication devices on the unlicensed spectrum and optimize the communication performance on the FRX band.

Figure 5:
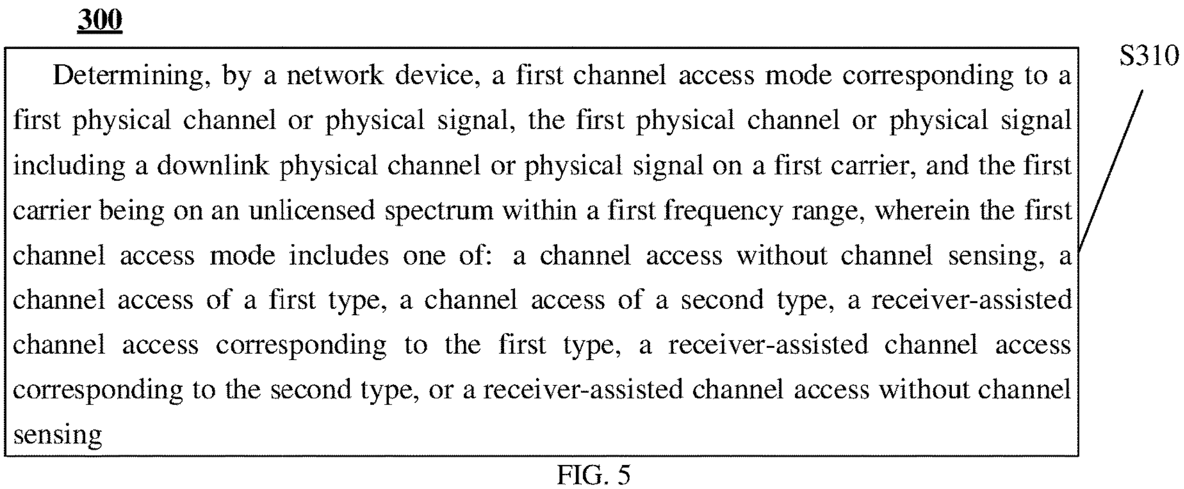
FIG. 5 is a schematic flow chart illustrating another channel access method according to an embodiment of the present disclosure.

FIG. 5 is a schematic flow chart illustrating a channel access method 300 according to an embodiment of the present disclosure. As shown in FIG. 5, the method 300 can include at least part of the following content.

At S310, a network device determines a first channel access mode corresponding to a first physical channel or physical signal. The first physical channel or physical signal includes a downlink physical channel or physical signal on a first carrier, and the first carrier is on an unlicensed spectrum within a first frequency range. The first channel access mode includes one of: a channel access without channel sensing, a channel access of a first type, a channel access of a second type, a receiver-assisted channel access corresponding to the first type, a receiver-assisted channel access corresponding to the second type, or a receiver-assisted channel access without channel sensing.

In an embodiment of the present disclosure, the network device determining the first channel access mode corresponding to the first physical channel or physical signal can include: the network device determining the first channel access mode as a channel access mode of initiating channel occupancy for the first physical channel or physical signal, or the network device transmitting the first physical channel or physical signal after initiating channel occupancy using the first channel access mode and succeeding in the channel access.

In particular, the first physical channel or physical signal can be a first physical channel or a first physical signal. That is, S310 can be that: the network device can determine the first channel access mode corresponding to the first physical channel based on predetermined rule. The first physical channel includes a downlink physical channel on the first carrier. Alternatively, S310 can be that: the network device can determine the first channel access mode corresponding to the first physical signal based on the predetermined rule. The first physical signal includes a downlink physical signal on the first carrier.

In some embodiments, the downlink physical channel on the first carrier can include, but is not limited to, at least one of: a Unicast Physical Downlink Shared Channel (PDSCH), or a Physical Downlink Control Channel (PDCCH).

In some embodiments, the downlink physical signal on the first carrier can include, but is not limited to, at least one of: a Channel State Information Reference Signal (CSI-RS), or an SSB transmission burst.

The SSB transmission burst can be, for example, SSB. Optionally, SSB includes a Primary Synchronization Signal (PSS), a Secondary Synchronization Signal (SSS), a Physical Broadcast Channel (PBCH), or a DMRS for PBCH.

It should be noted that, the SSB can also be referred to as SS/PBCH block.

It should be noted that in the embodiments of the present disclosure, the "predetermined rule" can be the information agreed in protocol. That is, the network device can determine the first channel access mode corresponding to the first physical channel or physical signal based on the information agreed in the protocol.

In an embodiment of the present disclosure, "unlicensed spectrum" can also be referred to as "shared spectrum" or "unlicensed frequency band", and the present disclosure is not limited to any of these examples. Further, in an embodiment of the present disclosure, "channel access" can also be referred to as "LBT", and "channel access mode" can also be referred to as "LBT mode", and the present disclosure is not limited to any of these examples.

In some embodiments, the first frequency range can be the FRX band described above, and the frequency range can be: 52.6 GHz-71 GHz. Of course, the first frequency range can also be another frequency band higher than FR1 or FR2, and the embodiments of the present disclosure are not limited to any of these examples.

In some embodiments, the channel access of the first type includes at least one of: a channel access of the first type corresponding to omnidirectional channel sensing, or a channel access of the first type corresponding to directional channel sensing.

That is, the channel access of the first type can correspond to the omnidirectional LBT and/or the directional LBT, and the channel access of the second type can correspond to the omnidirectional LBT and/or the directional LBT.

In some embodiments, the channel access of the first type is a channel access mode with sensing for a plurality of random backoff sensing slots.

In some embodiments, the channel access of the first type corresponding to omnidirectional channel sensing can also be referred to as the channel access of the first type, and the present disclosure are not limited to any of these examples.

In some embodiments, the channel access of the second type includes at least one of: a channel access of the second type corresponding to omnidirectional channel sensing, or a channel access of the second type corresponding to directional channel sensing.

That is, the channel access of the second type can correspond to the omnidirectional LBT and/or the directional LBT.

In some embodiments, the channel access of the second type is a channel access mode with sensing for a fixed sensing slot length.

In some embodiments, the channel access of the second type corresponding to omnidirectional channel sensing can also be referred to as the channel access of the second type, and the present disclosure are not limited to any of these examples.

In some embodiments, for the channel access without channel sensing, as an example, if a gap between the uplink transmission burst and the downlink transmission burst does not exceed 16 microseconds, the network device can start to transmit the downlink transmission burst without channel sensing after the uplink transmission burst ends; as another example, if the network device determines that the channel access mode on the first carrier on the unlicensed spectrum is the channel access without channel sensing, the network device can directly transmit the first physical channel or physical signal without channel sensing on the first carrier.

In some embodiments, the receiver-assisted channel access includes a channel sensing mode based on a request-response procedure. For example, the receiver-assisted channel access includes a channel sensing mode based on interaction of transmission request information and transmission response information.

As an example, during the communication between the first device and the second device, the first device transmits a transmission request information to ask whether the second device is ready for data transmission before the data transmission occurs. After the second device receives the transmission request information, if the channel access procedure succeeds, the second device can transmit transmission response information to the first device to inform the first device that it is ready for data transmission. The first device can transmit data to the second device after receiving the transmission response information. Alternatively, if the second device does not receive the transmission request information, or if the second device receives the transmission request information but cannot transmit the transmission response information due to channel access failure, the second device will not transmit the transmission response information to the first device. The first device can abandon the data transmission to the second device when receiving no transmission response information from the second device.

In some embodiments, the receiver-assisted channel access corresponding to the first type includes: channel access for transmitting the transmission request information being the channel access of the first type, and/or, channel access for transmitting the transmission response information being the channel access of the first type.

In some embodiments, the receiver-assisted channel access corresponding to the second type includes: channel access for transmitting the transmission request information being the channel access of the second type, and/or, channel access for transmitting the transmission response information being the channel access of the second type.

In some embodiments, the receiver-assisted channel access without channel sensing includes: channel access for transmitting the transmission request information being the channel access without channel sensing, and/or, channel access for transmitting the transmission response information being the channel access without channel sensing.

It should be noted that omnidirectional LBT can refer to: when the communication device senses a channel on the sensing time slot, the sensed energy includes the energy in all directions. Directional LBT can refer to: when the communication device senses a channel on the sensing time slot, the sensed energy includes the energy in a certain direction or in some specific directions.

In some embodiments, the channel access of the first type is a channel access mode with sensing for a plurality of random backoff sensing slots.

As an example, as shown in FIG. 3, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);

(2) If N>0, the counter decrements by 1, that is, N=N−1;

(3) Perform sensing on the channel for a sensing time slot length of 5 μs, and if the sensing time slot result is idle, perform step (4); otherwise, perform step (5);

(4) If N=0, the channel access procedure ends; otherwise, perform step (2);

(5) Perform sensing on the channel for a sensing time slot length of 8 μs, and if the sensing time slot result is idle, perform step (3); otherwise, perform step (5).

As another example, as shown in FIG. 4, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);

(2) If N>0, the counter decrements by 1, that is, N=N−1;

(3) Perform sensing on the channel for a sensing time slot length of 5 μs, and if the sensing time slot result is idle, perform step (4); otherwise, perform step (5);

(4) If N=0, the channel access procedure ends; otherwise, perform step (2);

(5) Perform sensing on the channel for a sensing time slot length of 8 μs, and if the sensing time slot result is idle, perform step (4); otherwise, perform step (5).

In some embodiments, the value of Zmax is predefined, or configured by the network device, or determined by the communication device initiating the channel access procedure of the first type.

In some embodiments, the channel access of the second type is a channel access mode with sensing for a fixed sensing slot length.

In some embodiments, the channel access of the second type includes at least one of: a channel access mode with a fixed sensing slot length of a first predetermined value; a channel access mode with a fixed sensing slot length of a second predetermined value, where the second predetermined value is greater than the first predetermined value; or a channel access mode without channel sensing.

In some embodiments, the above S310 can specifically be: determining, by the network device, the first channel access mode corresponding to the first physical channel or physical signal based on the predetermined rule.

In some embodiments, the predetermined rule includes one of the following.

When the first physical channel or physical signal includes a unicast PDSCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes a PDCCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal only includes a CSI-RS, the first channel access mode includes one of: the channel access without channel sensing, the channel access of the second type, or the channel access of the first type.

When the first physical channel or physical signal includes an SSB transmission burst and the SSB transmission burst includes a unicast PDSCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes an SSB transmission burst and the SSB transmission burst includes no unicast PDSCH, the first channel access mode includes one of: the channel access without channel sensing, or the channel access of the second type.

When the first physical channel or physical signal includes transmission request information, the first channel access mode includes one of: the channel access without channel sensing, the channel access of the first type, or the channel access of the second type.

When the first physical channel or physical signal includes transmission response information, the first channel access mode includes one of: the channel access without channel sensing, the channel access of the first type, or the channel access of the second type.

In some embodiments, the predetermined rule includes one of the following.

When the first physical channel includes a unicast PDSCH, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical channel includes a PDCCH, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical signal only includes a CSI-RS, the first channel access mode includes one of: the channel access without channel sensing, the channel access of the second type corresponding to omnidirectional channel sensing, the channel access of the second type corresponding to directional channel sensing, the channel access of the first type corresponding to omnidirectional channel sensing, or the channel access of the first type corresponding to directional channel sensing.

When the first physical signal includes an SSB transmission burst and the SSB transmission burst includes a unicast PDSCH, the first channel access mode includes one of: the channel access of the first type corresponding to omnidirectional channel sensing, the channel access of the first type corresponding to directional channel sensing, the receiver-assisted channel access corresponding to the first type, the receiver-assisted channel access corresponding to the second type, the receiver-assisted channel access of the first type corresponding to directional channel sensing, the receiver-assisted channel access of the second type corresponding to directional channel sensing, or the receiver-assisted channel access without channel sensing.

When the first physical signal includes an SSB transmission burst and the SSB transmission burst includes no unicast PDSCH, the first channel access mode includes one of: the channel access without channel sensing, the channel access of the second type corresponding to omnidirectional channel sensing, or the channel access of the second type corresponding to directional channel sensing.

When the first physical channel includes transmission request information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

When the first physical channel includes transmission response information, the first channel access mode includes one of: the channel access without channel sensing, the channel access of the first type corresponding to omnidirectional channel sensing, the channel access of the first type corresponding to directional channel sensing, the channel access of the second type corresponding to omnidirectional channel sensing, or the channel access of the second type corresponding to directional channel sensing.

In some embodiments, in a case that the first physical signal includes an SSB transmission burst and the SSB transmission burst includes no unicast PDSCH, a certain condition needs to be satisfied for the first channel access mode to be the channel access without channel sensing. The condition may be a predefined condition. As an example, the condition includes that: a duty cycle of the SSB transmission burst is 1/20. As another example, the condition includes that: the time domain resources occupied by the SSB transmissions burst during a period of 100 ms do not exceed 10 ms.

In some embodiments, in a case that the first physical signal only includes CSI-RS, a certain condition needs to be satisfied for the first channel access mode to be the channel access without channel sensing. For example, the condition is a predetermined condition. As an example, the condition includes that: a duty cycle of the first physical signal only including CSI-RS is 1/20. As another example, the condition includes that: the time domain resources occupied by the first physical signal only including CSI-RS during a period of 100 ms do not exceed 10 ms.

Optionally, as an example, the network device determines the first channel access mode corresponding to the first physical channel or physical signal based on the predetermined rule, including at least one row as shown in Table 6 below. Optionally, the network device can determine by itself to use the omnidirectional channel sensing or the directional channel sensing.

TABLE 6

| First physical channel or physical signal | First channel access mode |
|---|---|
| PDSCH | Channel access of the first type corresponding to omnidirectional channel sensing or channel access of the first type corresponding to directional channel sensing |
| PDCCH | Channel access of the first type corresponding to omnidirectional channel sensing or channel access of the first type corresponding to directional channel sensing |
| Only includes CSI-RS | Channel access without channel sensing |

TABLE 6-continued

| First physical channel or physical signal | First channel access mode |
|---|---|
| Includes SSB and includes user unicast data | Channel access of the first type corresponding to omnidirectional channel sensing or channel access of the first type corresponding to directional channel sensing |
| Includes SSB and includes no user unicast data | Channel access without channel sensing |
| Transmission request information | Channel access of the second type corresponding to omnidirectional channel sensing or channel access of the second type corresponding to directional channel sensing |
| Transmission response information | Channel access of the second type corresponding to omnidirectional channel sensing or channel access of the second type corresponding to directional channel sensing |

Thus, according to embodiments of the present disclosure, the network device can determine the first access mode corresponding to the first physical channel or physical signal based on the predetermined rule, and the first physical channel or physical signal includes the downlink physical channel or physical signal on the first carrier on the unlicensed spectrum included in the first frequency range. In other words, when the network device performs channel access on the unlicensed spectrum in the FRX band, a corresponding channel access mode can be determined, and the network device can use corresponding channel access modes when transmitting different channels or signals, so as to ensure the friendly coexistence of different communication devices on the unlicensed spectrum and optimize the communication performance on the FRX band.

Figure 6:
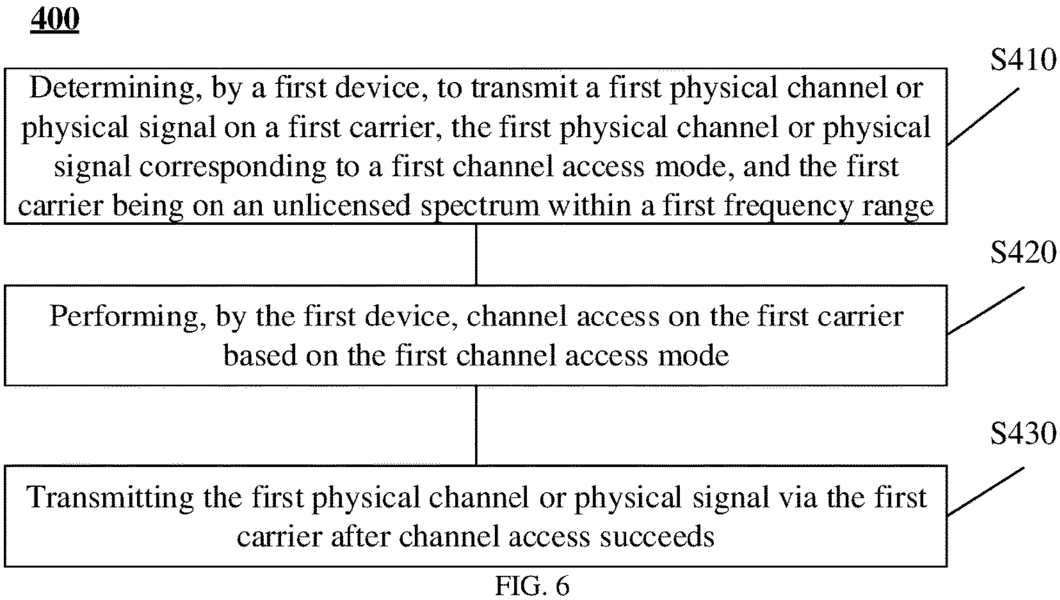
FIG. 6 is a schematic flow chart illustrating yet another channel access method according to an embodiment of the present disclosure.

FIG. 6 is a schematic flow chart illustrating a channel access method 400 according to an embodiment of the present disclosure. As shown in FIG. 6, the method 400 can include at least part of the following content.

At S410, a first device determines to transmit a first physical channel or physical signal on a first carrier. The first physical channel or physical signal corresponds to a first channel access mode, and the first carrier is on an unlicensed spectrum within a first frequency range.

At S420, the first device performs channel access on the first carrier based on the first channel access mode.

At S430, the first physical channel or physical signal is transmitted via the first carrier after channel access succeeds.

In embodiments of the present disclosure, the first physical channel or physical signal corresponding to the first channel access mode can include: the first channel access mode being a channel access mode of initiating channel occupancy for the first physical channel or physical signal, or transmitting the first physical channel or physical signal after initiating channel occupancy usin.g the first channel access mode and succeeding in the channel access.

In particular, the first physical channel or physical signal can be a first physical channel or a first physical signal.

In some embodiments, the first device can be the terminal device. In this case, the first physical channel can include an uplink physical channel on the first carrier and/or a sidelink physical channel on the first carrier, the first physical signal includes an uplink physical signal on the first carrier and/or a sidelink physical signal on the first carrier.

In some embodiments, the first device can also be the network device. In this case, the first physical channel includes a downlink physical channel on the first carrier, and the first physical signal includes a downlink physical signal on the first carrier.

In some embodiments, in a case that the first device is the terminal device, the uplink physical channel on the first carrier can include, but is not limited to, at least one of: a PUSCH, a PUCCH, or a PRACH.

In some embodiments, in a case that the first device is the terminal device, the sidelink physical channel on the first carrier can include, but is not limited to, at least one of: a PSCCH, a PSSCH, or a PSFCH.

In some embodiments, in a case that the first device is the terminal device, the first physical signal can include, but is not limited to, at least one of: an SSB transmission burst, or an SRS.

In some embodiments, in a case that the first device is the network device, the first downlink physical channel on the first carrier can include, but is not limited to, at least one of: a unicast PDSCH, or a PDCCH.

In some embodiments, in a case that the first device is the terminal device, the first physical downlink signal on the first carrier can include, but is not limited to, at least one of: a CSI-RS, or an SSB transmission burst.

In the case of sidelink transmission, SSB transmission burst can be, for example, S-SSB. Optionally, S-SSB includes a S-PSS, a S-SSS, a PSBCH, or a DMRS for PSBCH.

In the case of downlink transmission, SSB transmission burst can be, for example, SSB. Optionally, SSB includes a PSS, an SSS, a PBCH, or a DMRS for PBCH.

It should be noted that SSB can also be referred to as SS/PBCH block. S-SSB can also be referred to as S-SS/PSBCH block.

In an embodiment of the present disclosure, “unlicensed spectrum” can also be referred to as “shared spectrum” or “unlicensed frequency band”, and the present disclosure is not limited to any of these examples. Further, in an embodiment of the present disclosure, “channel access” can also be referred to as “LBT”, and “channel access mode” can also be referred to as “LBT mode”, and the present disclosure is not limited to any of these examples.

In some embodiments, the first frequency range can be the FRX band described above, and the frequency range can be: 52.6 GHz-71 GHz. Of course, the first frequency range can also be another frequency band higher than FR1 or FR2, and the embodiments of the present disclosure are not limited to any of these examples.

In some embodiments, the channel access of the first type can be referred to as the channel access of the first type corresponding to omnidirectional channel sensing. The channel access of the second type can be referred to as the channel access of the second type corresponding to omnidirectional channel sensing.

That is, the channel access of the first type can correspond to the omnidirectional LBT and/or the directional LBT, and the channel access of the second type can correspond to the omnidirectional LBT and/or the directional LBT.

It should be noted that omnidirectional LBT can refer to: when the communication device senses a channel on the sensing time slot, the sensed energy includes the energy in all directions. Directional LBT can refer to: when the communication device senses a channel on the sensing time slot, the sensed energy includes the energy in a certain direction or in some specific directions.

In some embodiments, the first channel access mode is the channel access of the first type, and the channel access of the first type is a channel access procedure with sensing for a plurality of random backoff sensing slots.

In some embodiments, the first channel access mode is the channel access of the second type, and the channel access of the second type is a channel access mode with sensing for a fixed sensing slot length.

In some embodiments, a channel access procedure corresponding to the first channel access mode is: a channel access procedure with channel sensing for a fixed sensing slot length; or a channel access procedure without channel sensing.

In some embodiments, the channel access of the first type is a channel access mode with sensing for a plurality of random backoff sensing slots.

In some embodiments, a channel access procedure corresponding to the first channel access mode is: a channel access procedure with channel sensing for a plurality of random backoff sensing slots. Optionally, the first channel access mode is the channel access of the first type.

In some embodiments, when channel sensing fails during the channel access procedure, a counter doesn't decrement by 1 for a first sensing slot with successful channel sensing after the channel sensing fails. As an example, as shown in FIG. 3, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);
(2) If N>0, the counter decrements by 1, that is, N=N−1;
(3) Perform sensing on the channel for a sensing time slot length of 5 μs, and if the sensing time slot result is idle, perform step (4); otherwise, perform step (5);
(4) If N=0, the channel access procedure ends; otherwise, perform step (2);
(5) Perform sensing on the channel for a sensing time slot length of 8 μs, and if the sensing time slot result is idle, perform step (3); otherwise, perform step (5).

In some embodiments, when channel sensing fails during the channel access procedure, a counter decrements by 1 for a first sensing slot with successful channel sensing after the channel sensing fails. As another example, as shown in FIG. 4, the channel access procedure of the first type includes the following steps:

(1) Set a counter N=Ninit, where Ninit is a random number evenly distributed between 0 and Zmax, and the value of Zmax is greater than or equal to 3; perform sensing on the channel for a sensing time slot length of 8 μs, and after the sensing time slot result is idle, perform step (4);
(2) If N>0, the counter decrements by 1, that is, N=N−1;
(3) Perform sensing on the channel for a sensing time slot length of 5 μs, and if the sensing time slot result is idle, perform step (4); otherwise, perform step (5);
(4) If N=0, the channel access procedure ends; otherwise, perform step (2);
(5) Perform sensing on the channel for a sensing time slot length of 8 μs, and if the sensing time slot result is idle, perform step (4); otherwise, perform step (5).

In some embodiments, the value of Zmax is predefined, or configured by the network device, or determined by the communication device initiating the channel access procedure of the first type.

In some embodiments, the channel access of the second type is a channel access mode with sensing for a fixed sensing slot length.

In some embodiments, the channel access of the second type includes at least one of: a channel access mode with a fixed sensing slot length of a first predetermined value; a channel access mode with a fixed sensing slot length of a second predetermined value, where the second predetermined value is greater than the first predetermined value; or a channel access mode without channel sensing.

In some embodiments, a relation between the first channel access and a first gap includes at least one of: when a length of a first gap is smaller than or equal to a first predetermined value, the channel access procedure corresponding to the first channel access mode is the channel access procedure without channel sensing; or when a length of a first gap is greater than or equal to the first predetermined value, the channel access procedure corresponding to the first channel access mode is the channel access procedure with a fixed sensing slot length, the fixed sensing slot length being the first predetermined value. The first gap is a gap between a start position of the first physical channel or physical signal and an end position of a first transmission burst, and the first transmission burst is a prior transmission burst corresponding to the first physical channel or physical signal.

Optionally, the channel access procedure corresponding to the first channel access mode is the channel access procedure with channel sensing for the fixed sensing slot length, the fixed sensing slot length being a first predetermined value.

In some other embodiments, a relation between the first channel access and a first gap includes at least one of: when a length of a first gap is smaller than or equal to a first predetermined value, the channel access procedure corresponding to the first channel access mode is the channel access procedure without channel sensing; or when a length of a first gap is greater than or equal to a first predetermined value and smaller than a second predetermined value, the channel access procedure corresponding to the first channel access mode is a channel access procedure having a fixed sensing slot length, the fixed sensing slot length being the first predetermined value; or when a length of a first gap is greater than or equal to the second predetermined value, the channel access procedure corresponding to the first channel access mode is a channel access procedure having a fixed sensing slot length, the fixed sensing slot length being the second predetermining value. The first gap is a gap between a start position of the first physical channel or physical signal and an end position of a first transmission burst, and the first transmission burst is a prior transmission burst corresponding to the first physical channel or physical signal.

In some embodiments, the channel access procedure corresponding to the first physical channel or physical signal includes the channel access procedure with channel sensing for the fixed sensing slot length, the fixed sensing slot length being a first predetermined value or a second predetermined value, and the second predetermined value being greater than the first predetermined value.

In some embodiments, the first predetermined value and the second predetermined value include one of: the first predetermined value is 16 μs, and the second predetermined value is 25 μs; or the first predetermined value is 8 μs, and the second predetermined value is 13 μs; or the first predetermined value is 16 μs, and the second predetermined value is 21 μs.

In some embodiments, the first predetermined value includes one of: 5 μs, 8 μs, 9 μs, 13 μs, 16 μs, 21 μs, or 25 μs.

For example, in the LBE channel access mechanism, the first predetermined value is one of: 8 μs, 13 μs, 16 μs, 21 μs, or 25 μs. As another example, in the FBE channel access mechanism, the first predetermined value is 5 μs or 9 μs.

In some embodiments, the length of the first gap is equal to the first predetermined value, the channel access procedure corresponding to the first channel access mode is the channel access procedure without channel sensing, and a length of a second transmission burst is smaller than or equal to a third predetermined value, the second transmission burst being a transmission burst to which the first physical channel or physical signal belongs.

In some embodiments, the first predetermined value includes a length of an integer number of symbols, and/or a size of the first predetermined value is related to a subcarrier spacing. For example, the size of the first predetermined value varies for different subcarrier spacings. As an example, when the subcarrier spacing corresponds to 960 kHz, the first predetermined value includes a length of 8 symbols; when the subcarrier spacing corresponds to 480 kHz, the first predetermined value includes a length of 4 symbols; when the subcarrier spacing corresponds to 240 kHz, the first predetermined value includes a length of 2 symbols; and when the subcarrier spacing corresponds to 120 kHz, the first predetermined value includes a length of one symbol.

In some embodiments, the second predetermined value includes a length of an integer number of symbols, and/or a size of the second predetermined value is related to a subcarrier spacing. For example, the size of the second predetermined value varies for different subcarrier spacings. As an example, when the subcarrier spacing corresponds to 960 kHz, the second predetermined value includes a length of 12 symbols; when the subcarrier spacing corresponds to 480 kHz, the second predetermined value includes a length of 6 symbols; when the subcarrier spacing corresponds to 240 kHz, the second predetermined value includes a length of 3 symbols; and when the subcarrier spacing corresponds to 120 kHz, the second predetermined value includes a length of 2 symbols. As an example, when the subcarrier spacing corresponds to 960 kHz, the first predetermined value includes a length of 8 symbols; when the subcarrier spacing corresponds to 480 kHz, the first predetermined value includes a length of 4 symbols; and when the subcarrier spacing corresponds to 120 kHz, the first predetermined value includes a length of one symbol. As an example, when the subcarrier spacing corresponds to 960 kHz, the first predetermined value includes a length of 12 symbols; when the subcarrier spacing corresponds to 480 kHz, the first predetermined value includes a length of 6 symbols; when the subcarrier spacing corresponds to 240 kHz, the first predetermined value includes a length of 3 symbols; and when the subcarrier spacing corresponds to 120 kHz, the first predetermined value includes a length of 2 symbols.

In some embodiments, the third predetermined value includes a length of an integer number of symbols, and/or a size of the third predetermined value is related to a subcarrier spacing. For example, the size of the third predetermined value varies for different subcarrier spacings. As an example, when the subcarrier spacing corresponding to the second transmission burst is 120 kHz, the third predetermined value includes a length of 16 symbols; when the subcarrier spacing corresponding to the second transmission burst is 480 kHz, the third predetermined value includes a length of 64 symbols; and when the subcarrier spacing corresponding to the second transmission burst is 960 kHz, the third predetermined value includes a length of 128 symbols. As another example, when the subcarrier spacing corresponding to the second transmission burst is 120 kHz, the third predetermined value includes a length of 2 symbols; when the subcarrier spacing corresponding to the second transmission burst is 480 kHz, the third predetermined value includes a length of 8 symbols; and when the subcarrier spacing corresponding to the second transmission burst is 960 kHz, the third predetermined value includes a length of 16 symbols.

In some embodiments, the first gap includes a length of an integer number of symbols, and/or a size of the first gap is related to a subcarrier spacing. For example, the size of the first gap varies for different subcarrier spacings. As an example, when the subcarrier spacing corresponds to 960 kHz, the first gap includes a length of 8 symbols; when the subcarrier spacing corresponds to 480 kHz, the first gap includes a length of 4 symbols; when the subcarrier spacing corresponds to 240 kHz, the first gap includes a length of 2 symbols; and when the subcarrier spacing corresponds to 120 kHz, the first gap includes a length of one symbol.

In some embodiments, the first channel access mode is the channel access of the second type.

Figure 7:
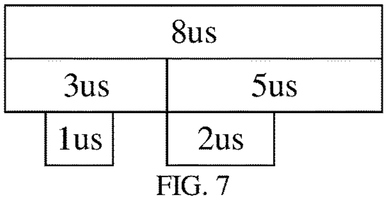
FIG. 7 is a schematic diagram showing channel access with a fixed sensing slot length of 8 us according to an embodiment of the present disclosure.

As an example, FIG. 7 shows the channel access mode with a fixed sensing slot length of 8 μs. The sensing slot of 8 μs includes a sensing slot of 3 μs at the start position, and a sensing slot of 5 μs at the end position. If the sensing results of both sensing slots are idle, LBT is considered successful, otherwise LBT is considered failure. As an example, if the sensed energy is lower than a threshold for 1 μs in the 3 μs sensing time slot, the sensing result of the sensing slot is considered idle. If the sensed energy is lower than the threshold for 2 μs in the 5 μs sensing slot, the sensing result of the sensing slot is considered idle.

Figure 8:
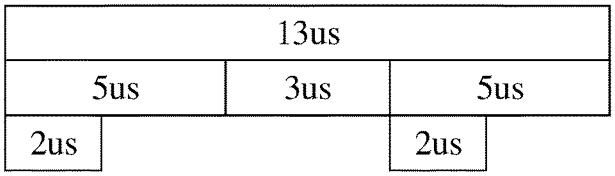
FIG. 8 is a schematic diagram showing channel access with a fixed sensing slot length of 13 us according to an embodiment of the present disclosure.

As an example, FIG. 8 shows the channel access mode with a fixed sensing slot length of 13 μs. The sensing slot of 13 μs includes a sensing slot of 5 μs at each of the start position and the end position. If the sensing results of both sensing slots are idle, LBT is considered successful, otherwise LBT is considered failure. As an example, if the sensed energy is lower than a threshold for 2 μs in the 5 μs sensing time slot, the sensing result of the sensing slot is considered idle.

In some embodiments, said performing, by the first device, channel access on the first carrier based on the first channel access mode includes: performing, by the first device, channel access on the first carrier based on omnidirectional channel sensing and the first channel access mode; or performing, by the first device, channel access on the first carrier based on directional channel sensing and the first channel access mode.

Thus, according to embodiments of the present disclosure, the first device determines to transmit the first physical channel or physical signal on the first carrier on the unlicensed spectrum included in the first frequency range, and the first physical channel or physical signal corresponds to the first access mode. In other words, when the first device performs channel access on the unlicensed spectrum in the FRX band, a corresponding channel access mode can be determined, and the first device can use corresponding channel access modes when transmitting different channels or signals, so as to ensure the friendly coexistence of different communication devices on the unlicensed spectrum and optimize the communication performance on the FRX band.

The method embodiments of the present disclosure have been described in detail above with reference to FIG. 2 to FIG. 8, and the apparatus embodiments of the present disclosure will be described in detail below with reference to FIG. 9 to FIG. 14. It should be understood that the apparatus embodiments and the method embodiments correspond to each other, and for similar descriptions, reference can be made to the method embodiments.

Figure 9:
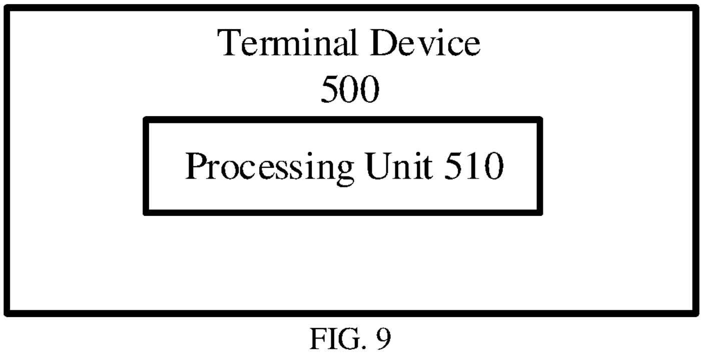
FIG. 9 is a schematic block diagram of a terminal device according to an embodiment of the present disclosure.

FIG. 9 shows a schematic block diagram of a terminal device 500 according to an embodiment of the present disclosure. As shown in FIG. 9, the terminal device 500 includes: a processing unit 510 configured to determine a first channel access mode corresponding to a first physical channel or physical signal. The first physical channel or physical signal includes an uplink physical channel or physical signal on a first carrier, and/or the first physical channel or physical signal includes a sidelink physical channel or physical signal on the first carrier. The first carrier is on an unlicensed spectrum within a first frequency range. The first channel access mode includes one of: a channel access without channel sensing, a channel access of a first type, a channel access of a second type, a receiver-assisted channel access corresponding to the first type, a receiver-assisted channel access corresponding to the second type, or a receiver-assisted channel access without channel sensing.

In some embodiments, the channel access of the first type includes at least one of: a channel access of the first type corresponding to omnidirectional channel sensing, or a channel access of the first type corresponding to directional channel sensing.

In some embodiments, the channel access of the second type includes at least one of: a channel access of the second type corresponding to omnidirectional channel sensing, or a channel access of the second type corresponding to directional channel sensing.

In some embodiments, the channel access of the first type is a channel access mode with sensing for a plurality of random backoff sensing slots.

In some embodiments, the channel access of the second type is a channel access mode with sensing for a fixed sensing slot length.

In some embodiments, the processing unit 510 is specifically configured to: determine the first channel access mode corresponding to the first physical channel or physical signal based on a predetermined rule.

In some embodiments, the first physical channel or physical signal includes the sidelink physical channel or physical signal on the first carrier, and the predetermined rule includes one of the following.

When the first physical channel or physical signal includes a Physical Sidelink Shared Channel (PSSCH), the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal only includes a Physical Sidelink Feedback Channel (PSFCH) carrying Hybrid Automatic Repeat reQuest-ACKnowledgement (HARQ-ACK) information, the first channel access mode includes one of: the channel access without channel sensing, or the channel access of the second type.

When the first physical channel or physical signal includes a Physical Sidelink Control Channel (PSCCH), the first channel access mode includes at least one of: the channel access without channel sensing, the channel access of the first type, or the channel access of the second type.

When the first physical channel or physical signal includes transmission request information, the first channel access mode includes one of: the channel access without channel sensing, the channel access of the first type, or the channel access of the second type.

When the first physical channel or physical signal includes transmission response information, the first channel access mode includes one of: the channel access without channel sensing, the channel access of the first type, or the channel access of the second type.

In some embodiments, the first physical channel or physical signal includes the uplink physical channel or physical signal on the first carrier, and the predetermined rule includes one of the following.

When the first physical channel or physical signal includes a Physical Uplink Shared Channel (PUSCH), the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes a Physical Random Access Channel (PRACH), the first channel access mode includes one of: the channel access without channel sensing, the channel access of the second type, or the channel access of the first type.

When the first physical channel or physical signal only includes a Physical Uplink Control Channel (PUCCH) carrying no HARQ-ACK information, or when the first physical channel or physical signal only includes a PUSCH carrying no HARQ-ACK information and with no data, the first channel access mode includes one of: the channel access of the second type, or the channel access of the first type.

When the first physical channel or physical signal only includes a PUCCH carrying HARQ-ACK information, or when the first physical channel only includes a PUSCH carrying HARQ-ACK information and with no data, the first channel access mode includes one of: the channel access without channel sensing, or the channel access of the second type.

When the first physical channel or physical signal includes transmission request information, the first channel access mode includes one of: the channel access without channel sensing, the channel access of the second type, or the channel access of the first type.

When the first physical channel or physical signal includes transmission response information, the first channel access mode includes one of: the channel access without channel sensing, the channel access of the second type, or the channel access of the first type.

In some embodiments, the predetermined rule includes one of the following.

When the first physical channel or physical signal only includes a Sounding Reference Signal (SRS), the first channel access mode includes one of: the channel access without channel sensing, the channel access of the second type, or the channel access of the first type.

When the first physical channel or physical signal includes a Synchronization Signal Block (SSB) transmission burst and the SSB transmission burst includes user data, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes an SSB transmission burst and the SSB transmission burst includes no user data, the first channel access mode includes one of: the channel access without channel sensing, or the channel access of the second type.

In some embodiments, the processing unit 510 is specifically configured to: determine the first channel access mode corresponding to the first physical channel or physical signal based on first indication information, the first indication information indicating a channel access mode.

In some embodiments, the processing unit 510 is specifically configured to: determine the first channel access mode corresponding to the first physical channel or physical signal based on first indication information and a predetermined rule, the first indication information indicating a channel access mode.

In some embodiments, the processing unit 510 is specifically configured to: determine, when the channel access mode corresponding to the first physical channel or physical signal indicated by the first indication information is different from the channel access mode corresponding to the first physical channel or physical signal defined by the predetermined rule, the first channel access mode corresponding to the first physical channel or physical signal based on the channel access mode indicated by the first indication information. The first indication information indicates that the first physical channel or physical signal corresponds to the first channel access mode, and the predetermined rule predefines that the first physical channel or physical signal corresponds to a second channel access mode.

In some embodiments, the second channel access mode includes one of: the channel access without channel sensing, the channel access of the first type, the channel access of the second type, the receiver-assisted channel access corresponding to the first type, the receiver-assisted channel access corresponding to the second type, or the receiver-assisted channel access without channel sensing.

In some embodiments, the channel access of the first type includes at least one of: a channel access of the first type corresponding to omnidirectional channel sensing, or a channel access of the first type corresponding to directional channel sensing.

In some embodiments, the channel access of the second type includes at least one of: a channel access of the second type corresponding to omnidirectional channel sensing, or a channel access of the second type corresponding to directional channel sensing.

In some embodiments, the first indication information indicates a channel access mode and/or a Cyclic Prefix Extension (CPE) length that are jointly coded.

In some embodiments, a type of a channel sensing beam corresponding to the channel access mode is determined based on a higher layer parameter configured by a network device, or indicated by the first indication information, or predetermined; and/or a direction of the channel sensing beam is determined based on a higher layer parameter configured by a network device, or indicated by the first indication information, or predetermined.

In some embodiments, the type of the channel sensing beam corresponding to the channel access mode includes a type corresponding to omnidirectional channel sensing or a type corresponding to directional channel sensing.

In some embodiments, the above processing unit can be one or more processors.

It should be understood that the terminal device 500 according to the embodiment of the present disclosure can correspond to the terminal device in the method embodiment of the present disclosure, and the above and other operations and/or functions of the respective units in the terminal device 300 are provided for the purpose of implementing the process flow corresponding to the terminal device in the method 200 shown in FIG. 2, and details thereof will be not omitted here for brevity.

Figure 10:
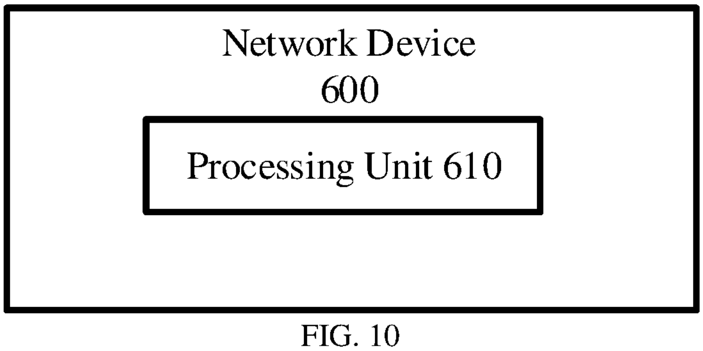
FIG. 10 is a schematic block diagram of a network device according to an embodiment of the present disclosure.

FIG. 10 shows a schematic block diagram of a network device 600 according to an embodiment of the present disclosure. As shown in FIG. 10, the network device 600 includes: a processing unit 610 configured to determine a first channel access mode corresponding to a first physical channel or physical signal. The first physical channel or physical signal includes a downlink physical channel or physical signal on a first carrier, and the first carrier is on an unlicensed spectrum within a first frequency range.

In some embodiments, the first channel access mode includes one of: a channel access without channel sensing, a channel access of a first type, a channel access of a second type, a receiver-assisted channel access corresponding to the first type, a receiver-assisted channel access corresponding to the second type, or a receiver-assisted channel access without channel sensing.

In some embodiments, the channel access of the first type includes at least one of: a channel access of the first type corresponding to omnidirectional channel sensing, or a channel access of the first type corresponding to directional channel sensing.

In some embodiments, the channel access of the second type includes at least one of: a channel access of the second type corresponding to omnidirectional channel sensing, or a channel access of the second type corresponding to directional channel sensing.

In some embodiments, the channel access of the first type is a channel access mode with sensing for a plurality of random backoff sensing slots.

In some embodiments, the channel access of the second type is a channel access mode with sensing for a fixed sensing slot length.

In some embodiments, the processing unit 610 is specifically configured to: determine the first channel access mode corresponding to the first physical channel or physical signal based on a predetermined rule.

In some embodiments, the predetermined rule includes one of the following.

When the first physical channel or physical signal includes a unicast Physical Downlink Shared Channel (PDSCH), the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes a Physical Downlink Control Channel (PDCCH), the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal only includes a Channel State Information Reference Signal (CSI-RS), the first channel access mode includes one of: the channel access without channel sensing, the channel access of the second type, or the channel access of the first type.

When the first physical channel or physical signal includes a Synchronization Signal Block (SSB) transmission burst and the SSB transmission burst includes a unicast PDSCH, the first channel access mode includes one of: the channel access of the first type, the receiver-assisted channel access corresponding to the first type, the receiver-assisted channel access corresponding to the second type, or the receiver-assisted channel access without channel sensing.

When the first physical channel or physical signal includes an SSB transmission burst and the SSB transmission burst includes no unicast PDSCH, the first channel access mode includes one of: the channel access without channel sensing, or the channel access of the second type.

When the first physical channel or physical signal includes transmission request information, the first channel access mode includes one of: the channel access without channel sensing, the channel access of the first type, or the channel access of the second type.

When the first physical channel or physical signal includes transmission response information, the first channel access mode includes one of: the channel access without channel sensing, the channel access of the first type, or the channel access of the second type.

In some embodiments, the above processing unit can be one or more processors.

It should be understood that the network device 600 according to the embodiment of the present disclosure can correspond to the network device in the method embodiment of the present disclosure, and the above and other operations and/or functions of the respective units in the network device 600 are provided for the purpose of implementing the process flow corresponding to the network device in the method 300 shown in FIG. 5, and details thereof will be not omitted here for brevity.

Figure 11:
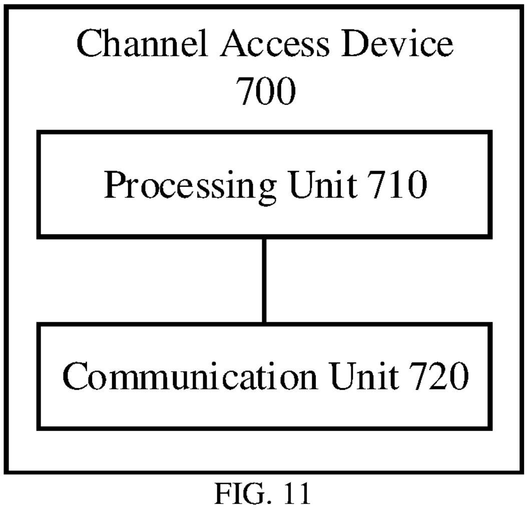
FIG. 11 is a schematic block diagram of a channel access device according to an embodiment of the present disclosure.

FIG. 11 shows a schematic block diagram of a channel access device 700 according to an embodiment of the present disclosure. As shown in FIG. 11, the channel access device 700 includes a processing unit 710 and a communication unit 720.

The processing unit 710 is configured to determine to transmit a first physical channel or physical signal on a first carrier. The first physical channel or physical signal corresponds to a first channel access mode, and the first carrier is on an unlicensed spectrum within a first frequency range.

The processing unit 710 is further configured to perform channel access on the first carrier based on the first channel access mode. The communication unit 720 is configured to transmit the first physical channel or physical signal via the first carrier after channel access succeeds.

In some embodiments, a channel access procedure corresponding to the first channel access mode is: a channel access procedure with channel sensing for a fixed sensing slot length; or a channel access procedure without channel sensing.

In some embodiments, when a length of a first gap is smaller than or equal to a first predetermined value, the channel access procedure corresponding to the first channel access mode is the channel access procedure without channel sensing. The first gap is a gap between a start position of the first physical channel or physical signal and an end position of a first transmission burst, and the first transmission burst is a prior transmission burst corresponding to the first physical channel or physical signal.

In some embodiments, the channel access procedure corresponding to the first channel access mode is the channel access procedure with channel sensing for the fixed sensing slot length. The fixed sensing slot length is a first predetermined value.

In some embodiments, when a length of a first gap is greater than or equal to the first predetermined value, the channel access procedure corresponding to the first channel access mode is the channel access procedure with channel sensing for the fixed sensing slot length. The fixed sensing slot length is the first predetermined value.

In some embodiments, when a length of a first gap is greater than or equal to a first predetermined value and smaller than a second predetermined value, the channel access procedure corresponding to the first channel access mode is a channel access procedure having a fixed sensing slot length, the fixed sensing slot length being the first predetermined value; or when a length of a first gap is greater than or equal to the second predetermined value, the channel access procedure corresponding to the first channel access mode is a channel access procedure having a fixed sensing slot length, the fixed sensing slot length being the second predetermining value; or when a length of a first gap is smaller than or equal to the first predetermined value, the channel access procedure corresponding to the first channel access mode is the channel access procedure without channel sensing.

The first gap is a gap between a start position of the first physical channel or physical signal and an end position of a first transmission burst, and the first transmission burst is a prior transmission burst corresponding to the first physical channel or physical signal.

In some embodiments, the channel access procedure corresponding to the first physical channel or physical signal includes the channel access procedure with channel sensing for the fixed sensing slot length. The fixed sensing slot length is a first predetermined value or a second predetermined value, and the second predetermined value is greater than the first predetermined value.

In some embodiments, the length of the first gap is equal to the first predetermined value, the channel access procedure corresponding to the first channel access mode is the channel access procedure without channel sensing, and a length of a second transmission burst is smaller than or equal to a third predetermined value, the second transmission burst being a transmission burst to which the first physical channel or physical signal belongs.

In some embodiments, the first predetermined value is 16 μs, and the second predetermined value is 25 μs; or the first predetermined value is 8 μs, and the second predetermined value is 13 μs; or the first predetermined value is 16 μs, and the second predetermined value is 21 μs.

In some embodiments, the first predetermined value includes one of: 5 μs, 8 μs, 9 μs, 13 μs, 16 μs, 21 μs, 25 μs.

In some embodiments, the first predetermined value includes a length of an integer number of symbols, and/or a size of the first predetermined value is related to a subcarrier spacing.

In some embodiments, the second predetermined value includes a length of an integer number of symbols, and/or a size of the second predetermined value is related to a subcarrier spacing.

In some embodiments, the third predetermined value includes a length of an integer number of symbols, and/or a size of the third predetermined value is related to a subcarrier spacing.

In some embodiments, the first gap includes a length of an integer number of symbols, and/or a size of the first gap is related to a subcarrier spacing.

In some embodiments, the first channel access mode is a channel access of a first type, and the channel access of the first type is a channel access procedure with channel sensing for a plurality of random backoff sensing slots.

In some embodiments, when channel sensing fails during the channel access procedure, a counter doesn't decrement by 1 for a first sensing slot with successful channel sensing after the channel sensing fails; or when channel sensing fails during the channel access procedure, a counter decrements by 1 for a first sensing slot with successful channel sensing after the channel sensing fails.

In some embodiments, the first channel access mode is a channel access of a second type, and the channel access of the second type is a channel access mode with sensing for a fixed sensing slot length.

In some embodiments, the processing unit 710 is specifically configured to: perform channel access on the first carrier based on omnidirectional channel sensing and the first channel access mode; or perform channel access on the first carrier based on directional channel sensing and the first channel access mode.

In some embodiments, the above communication unit can be a communication interface or a transceiver, or an input/output interface of a communication chip or a system-on-chip. The above processing unit can be one or more processors.

It should be understood that the channel access device 700 according to the embodiment of the present disclosure can correspond to the first device in the method embodiment of the present disclosure, and the above and other operations and/or functions of the respective units in the channel access device 700 are provided for the purpose of implementing the process flow corresponding to the first device in the method 400 shown in FIG. 6, and details thereof will be not omitted here for brevity.

Figure 12:
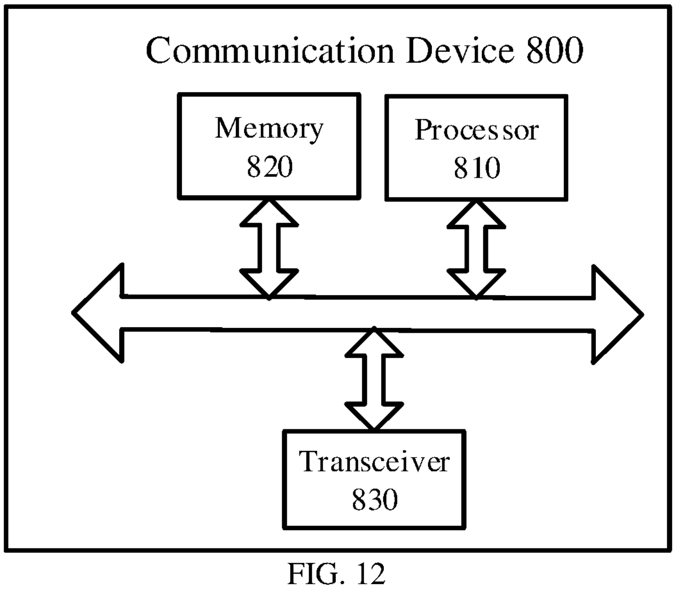
FIG. 12 is a schematic block diagram of a communication device according to an embodiment of the present disclosure.

FIG. 12 shows a schematic block diagram of a communication device 800 according to an embodiment of the present disclosure. As shown in FIG. 12, the communication device 800 includes a processor 810, and the processor 810 can invoke and execute a computer program from a memory to implement the method in the embodiment of the present disclosure.

In some embodiments, as shown in FIG. 12, the communication device 800 can further include a memory 820. The processor 810 can invoke and execute a computer program from the memory 820 to implement the method in the embodiment of the present disclosure.

The memory 820 can be a separate device independent from the processor 810, or can be integrated in the processor 810.

In some embodiments, as shown in FIG. 12, the communication device 800 can further include a transceiver 830, and the processor 810 can control the transceiver 830 to communicate with other devices, and in particular, transmit information or data to other devices, or receive information or data transmitted by other devices.

Here, the transceiver 830 can include a transmitter and a receiver. The transceiver 830 can further include one or more antennas.

In some embodiments, the communication device 800 can specifically be the network device according to the embodiment of the present disclosure, and the communication device 800 can implement the corresponding processes implemented by the network device in any of the methods according to the embodiments of the present disclosure. For the sake of brevity, details thereof will be omitted here.

In some embodiments, the communication device 800 can specifically be the terminal device according to the embodiment of the present disclosure, and the communication device 800 can implement the corresponding processes implemented by the terminal device in any of the methods according to the embodiments of the present disclosure. For the sake of brevity, details thereof will be omitted here.

Figure 13:
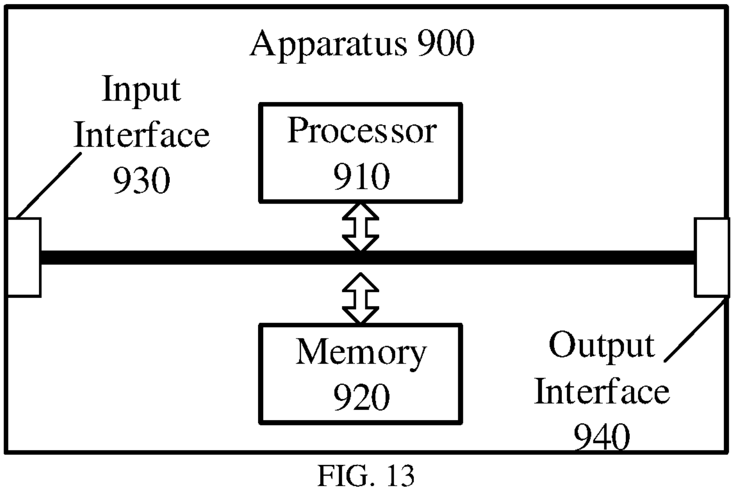
FIG. 13 is a schematic block diagram of an apparatus according to an embodiment of the present disclosure.

FIG. 13 is a schematic diagram showing a structure of an apparatus according to an embodiment of the present disclosure. The apparatus 900 shown in FIG. 13 includes a processor 910, and the processor 910 can invoke and execute a computer program from a memory to implement the method in the embodiment of the present disclosure.

In some embodiments, as shown in FIG. 13, the apparatus 900 can further include a memory 920. The processor 910 can invoke and execute a computer program from the memory 920 to implement the method in the embodiment of the present disclosure.

The memory 920 can be a separate device independent from the processor 910, or can be integrated in the processor 910.

In some embodiments, the apparatus 900 can further include an input interface 930. The processor 910 can control the input interface 930 to communicate with other devices or chips, and in particular, obtain information or data transmitted by other devices or chips.

In some embodiments, the apparatus 900 can further include an output interface 940. The processor 910 can control the output interface 940 to communicate with other devices or chips, and in particular, output information or data to other devices or chips.

In some embodiments, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

In some embodiments, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

In some embodiments, the apparatus in the embodiment of the present disclosure can be a chip, such as a system-level chip, a system-chip, a chip system, or a system-on-chip.

Figure 14:
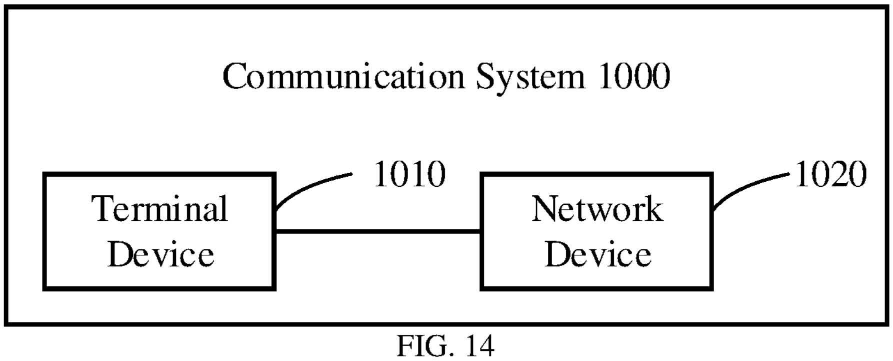
FIG. 14 is a schematic block diagram of a communication system according to an embodiment of the present disclosure.

FIG. 14 is a schematic block diagram showing a communication system 1000 according to an embodiment of the present disclosure. As shown in FIG. 14, the communication system 1000 includes a terminal device 1010 and a network device 1020.

Here, the terminal device 1010 can be configured to implement the corresponding functions implemented by the terminal device in the above method, and the network device 1020 can be configured to implement the corresponding functions implemented by the network device in the above method. For the sake of brevity, details thereof will be omitted here.

It is to be noted that the processor in the embodiment of the present disclosure can be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor can be a microprocessor or any conventional processor. The steps of the methods disclosed in the embodiments of the present disclosure can be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure can be a volatile memory or a non-volatile memory, or can include both volatile and non-volatile memories. Here, the non-volatile memory can be a Read-Only Memory (ROM), a Programmable ROM (PROM), an Erasable PROM (EPROM), an Electrically EPROM (EEPROM), or a flash memory. The volatile memory can be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, in some embodiments, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In some embodiments, the computer readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, in some embodiments, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In some embodiments, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, in some embodiments, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In some embodiments, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art can use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods can be implemented in other ways. For example, the device embodiments described above are illustrative only. For example, the divisions of the units are only divisions based on logical functions, and there can be other divisions in actual implementations. For example, more than one unit or component can be combined or integrated into another system, or some features can be ignored or omitted. In addition, the mutual coupling or direct coupling or communicative connection as shown or discussed can be indirect coupling or communicative connection between devices or units via some interfaces which can be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure can be integrated into one processing unit, or alternatively be separate physical modules, or two or more units can be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product can be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A channel access method, comprising:

determining, by a first device, to transmit a first physical channel or physical signal on a first carrier, the first physical channel or physical signal corresponding to a first channel access mode, and the first carrier being on an unlicensed spectrum within a first frequency range;

performing, by the first device, channel access on the first carrier based on the first channel access mode; and transmitting, by the first device, the first physical channel or physical signal via the first carrier after the channel access succeeds, wherein the first device determines that a channel access procedure corresponding to the first channel access mode is a channel access procedure with a first fixed sensing slot length when a length of a first gap is greater than or equal to a first predetermined value and is smaller than a second predetermined value, the first fixed sensing slot length comprising 5 μs; and the first device determines that the channel access procedure corresponding to the first channel access mode is a channel access procedure with a second fixed sensing slot length when the length of the first gap is greater than or equal to the second predetermined value, the second fixed sensing slot length comprising 8 μs;

wherein the first predetermined value comprises 8 μs, and the second predetermined value comprises 13 μs;

wherein the first gap is a gap between a start position of the first physical channel or physical signal and an end position of a first transmission burst, the first transmission burst being a prior transmission burst corresponding to the first physical channel or physical signal.

2. The method according to claim 1, wherein the first predetermined value comprises a length of an integer number of symbols, and/or the first predetermined value is related to a subcarrier spacing.

3. The method according to claim 1, wherein the first channel access mode further includes a channel access of a first type, and the channel access of the first type is a channel access procedure with channel sensing for a plurality of random backoff sensing slots.

4. The method according to claim 3, wherein when channel sensing fails during the channel access procedure, a counter is not decremented by 1 for a first sensing slot with successful channel sensing after the channel sensing fails.

5. The method according to claim 3, wherein when channel sensing fails during the channel access procedure, a counter is decremented by 1 for a first sensing slot with successful channel sensing after the channel sensing fails.

6. The method according to claim 1, wherein said performing, by the first device, channel access on the first carrier based on the first channel access mode comprises:

performing, by the first device, channel access on the first carrier based on omnidirectional channel sensing and the first channel access mode; or performing, by the first device, channel access on the first carrier based on directional channel sensing and the first channel access mode.

7. The method according to claim 1, wherein the first device further determines that the channel access procedure corresponding to the first channel access mode is a channel access procedure without channel sensing when the length of the first gap is smaller than the first predetermined value.

8. A channel access device, comprising a processor and a memory, wherein the memory has a computer program stored thereon, and the processor is configured to invoke and execute the computer program stored in the memory, to enable the channel access device to perform:

determining to transmit a first physical channel or physical signal on a first carrier, the first physical channel or physical signal corresponding to a first channel access mode, and the first carrier being on an unlicensed spectrum within a first frequency range;

performing channel access on the first carrier based on the first channel access mode; and transmitting the first physical channel or physical signal via the first carrier after the channel access succeeds, wherein the channel access device determines that a channel access procedure corresponding to the first channel access mode is a channel access procedure with a first fixed sensing slot length when a length of a first gap is greater than or equal to a first predetermined value and is smaller than a second predetermined value, the first fixed sensing slot length comprising 5 μs; and the channel access device determines that the channel access procedure corresponding to the first channel access mode is a channel access procedure with a second fixed sensing slot length when the length of the first gap is greater than or equal to the second predetermined value, the second fixed sensing slot length comprising 8 μs;

wherein the first predetermined value comprises 8 μs, and the second predetermined value comprises 13 μs;

wherein the first gap is a gap between a start position of the first physical channel or physical signal and an end position of a first transmission burst, the first transmission burst being a prior transmission burst corresponding to the first physical channel or physical signal.

9. The channel access device according to claim 8, wherein the first predetermined value comprises a length of an integer number of symbols, and/or the first predetermined value is related to a subcarrier spacing.

10. The channel access device according to claim 8, wherein the first channel access mode further comprises a channel access of a first type, and the channel access of the first type is a channel access procedure with channel sensing for a plurality of random backoff sensing slots.

11. The channel access device according to claim 10, wherein when channel sensing fails during the channel access procedure, a counter is not decremented by 1 for a first sensing slot with successful channel sensing after the channel sensing fails.

12. The channel access device according to claim 10, wherein when channel sensing fails during the channel access procedure, a counter is decremented by 1 for a first sensing slot with successful channel sensing after the channel sensing fails.

13. The channel access device according to claim 8, wherein said performing channel access on the first carrier based on the first channel access mode comprises:

performing channel access on the first carrier based on omnidirectional channel sensing and the first channel access mode; or performing channel access on the first carrier based on directional channel sensing and the first channel access mode.

14. The channel access device according to claim 8, wherein the first device further determines that the channel access procedure corresponding to the first channel access mode is a channel access procedure without channel sensing when the length of the first gap is smaller than the first predetermined value.

* * * * *